US012657602B2

(12) United States Patent
Mo

(10) Patent No.: US 12,657,602 B2
(45) Date of Patent: Jun. 16, 2026

(54) ADVERTISING DEVICE MONITORING METHOD AND DEVICE

(71) Applicant: HUAWEI TECHNOLOGIES CO., LTD., Shenzhen (CN)

(72) Inventor: Lan Mo, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 251 days.

(21) Appl. No.: 17/794,496

(22) PCT Filed: Oct. 30, 2020

(86) PCT No.: PCT/CN2020/125407
§ 371 (c)(1),
(2) Date: Jul. 21, 2022

(87) PCT Pub. No.: WO2021/147439
PCT Pub. Date: Jul. 29, 2021

(65) Prior Publication Data
US 2023/0078858 A1      Mar. 16, 2023

(30) Foreign Application Priority Data

Jan. 21, 2020    (CN) .......................... 202010072821.1

(51) Int. Cl.
*G06Q 30/02* (2023.01)
*G06Q 30/0241* (2023.01)
(Continued)

(52) U.S. Cl.
CPC ........ *G06Q 30/0241* (2013.01); *H04W 4/026* (2013.01); *H04W 4/029* (2018.02)

(58) Field of Classification Search
CPC ........... G06Q 30/0241; G06Q 30/0242; G06Q 30/0272; H04W 4/026; H04W 4/029;
(Continued)

(56) References Cited

U.S. PATENT DOCUMENTS 10,820,159 B1 * 10/2020 Zimroni ................ H04W 4/021
2007/0094355 A1     4/2007 Mulakala et al.
(Continued)

FOREIGN PATENT DOCUMENTS

CN          102064972 A       5/2011
CN          102123142 A       7/2011
(Continued)

OTHER PUBLICATIONS

Johan Larsson, Distance Estimation and Positioning based on Bluetooth Low Energy Technology, 2015, https://www.diva-portal.org/smash/get/diva2:859549/FULLTEXT01.pdf, pp. 1-37 (Year: 2015).*
(Continued)

*Primary Examiner* — John Van Bramer
(74) *Attorney, Agent, or Firm* — Fish & Richardson P.C.

(57) ABSTRACT

The present disclosure provides example advertising device monitoring methods and devices. One example method includes broadcasting, by an advertising device, a wireless signal including a first identifier of the advertising device. The wireless signal is detected by a mobile terminal. The advertising device is sent by the mobile terminal to a server, where the exposure data includes the first identifier of the advertising device. The exposure data is received by the server and from the mobile terminal. It is determined by the server whether the advertising device is installed and put into use.

10 Claims, 20 Drawing Sheets

(51) Int. Cl.
  *H04W 4/02*        (2018.01)
  *H04W 4/029*      (2018.01)

(58) Field of Classification Search
  CPC ... H04W 4/023; H04W 4/23; G06F 2201/875;
          G06F 11/3006; H04L 67/535; H04L
          67/025; H04N 7/183; H04N 7/181
  See application file for complete search history.

(56)               References Cited

U.S. PATENT DOCUMENTS

| | | | |
|---|---|---|---|
| 2008/0140479 A1* | 6/2008 | Mello | G06Q 30/0261 |
| | | | 705/14.54 |
| 2013/0132170 A1* | 5/2013 | Yelisetti | G06Q 30/02 |
| | | | 705/14.4 |
| 2014/0149221 A1 | 5/2014 | Rycyna, III | |
| 2017/0213240 A1* | 7/2017 | Waldron | H04W 4/023 |
| 2018/0206177 A1* | 7/2018 | Daoura | H04W 4/80 |
| 2020/0092698 A1* | 3/2020 | Samuelsson | H04W 76/11 |

FOREIGN PATENT DOCUMENTS

| | | | |
|---|---|---|---|
| CN | 202068474 U | 12/2011 |
| CN | 104008494 A | 8/2014 |
| CN | 104581068 A | 4/2015 |
| CN | 104683484 A | 6/2015 |
| CN | 105162846 A | 12/2015 |
| CN | 105451184 A | 3/2016 |
| CN | 105976216 A | 9/2016 |
| CN | 108009844 A | 5/2018 |
| CN | 108182607 A | 6/2018 |
| CN | 108881427 A | 11/2018 |
| CN | 109523247 A | 3/2019 |
| CN | 110033296 A | 7/2019 |
| CN | 110473017 A | 11/2019 |
| WO | 2008003089 A2 | 1/2008 |

OTHER PUBLICATIONS

Office Action in Chinese Appln. No. 202010990202.0, dated Apr. 20, 2021, 18 pages (with English translation).

Office Action in Indian Appln. No. 202217042515, dated Jan. 27, 2023, 7 pages (with English translation).

International Search Report and Written Opinion in International Appln. No. PCT/CN2020/125407, mailed on Jan. 27, 2021, 16 pages (with English translation).

Extended European Search Report in European Appln No. 20915806. 2, dated Apr. 6, 2023, 9 pages.

* cited by examiner

Advertising device 120

ADVERTISING DEVICE MONITORING METHOD AND DEVICE

CROSS-REFERENCE TO RELATED APPLICATIONS

This application is a national stage of International Application No. PCT/CN2020/125407, filed on Oct. 30, 2020, which claims priority to Chinese Patent Application No. 202010072821.1, filed on Jan. 21, 2020. Both of the aforementioned applications are hereby incorporated by reference in their entireties.

TECHNICAL FIELD

Embodiments of this application relate to the field of communications technologies and the field of electronic advertising technologies, and in particular, to an advertising device monitoring method and a device.

BACKGROUND

Electronic advertising is an advertising form in which advertising information is conveyed by using electronic information technologies and electronic media. Playing an electronic advertisement through an advertising device (for example, an electronic billboard) installed in public space has become a trend of advertising media. For example, the public space may include places such as an outdoor place (for example, a roadside) and a building (for example, an elevator room).

The advertising device installed in the public space may receive advertisement data and an advertisement play policy delivered by an advertising platform, and then play advertisement content corresponding to the advertisement data according to the advertisement play policy. The advertisement play policy may indicate a play time period and a quantity of play times of the electronic advertisement.

Currently, after the advertising device is installed, to facilitate monitoring of an installation status of the advertising device for example, whether the advertising device is installed, and whether the advertising device is installed at a correct location), people usually need to take photos to keep the certificate for future reference. In addition, the installation status of the advertising device may need to be monitored by regularly arranging inspection by advertisement operation personnel.

Similarly, after the electronic advertisement of the advertising device is updated, a delivery status of the electronic advertisement also needs to be monitored by manually taking photos or regularly arranging inspection by the advertisement operation personnel (for example, whether the electronic advertisement is played on a specified advertising device, and whether a play time period is a specified time period).

In the foregoing monitoring solution, accuracy and credibility of the monitoring result cannot be ensured because of manual monitoring by the advertisement operation personnel. For example, accuracy and credibility of the monitoring result may be low due to reasons such as untimely inspection, incorrect information input after inspection, or manual cheating by the advertisement operation personnel. In addition, costs of the manual monitoring by the advertisement operation personnel are relatively high.

SUMMARY

This application provides an advertising device monitoring method and a device, so as to improve accuracy and credibility of a monitoring result, and reduce monitoring costs.

According to a first aspect, this application provides an advertising device monitoring method. The method may be applied to an advertising system that includes a server, an advertising device, and a mobile terminal. The advertising device monitoring method may include: The advertising device may broadcast a wireless signal, where the wireless signal includes a first identifier of the advertising device. The mobile terminal may detect the wireless signal, and then send exposure data of the advertising device to the server, where the exposure data includes the first identifier of the advertising device. The server may receive the exposure data from the mobile terminal, and then determine, based on the exposure data, that the advertising device is installed and put into use.

In this solution, the mobile terminal reports the exposure data of the advertising device to the server based on the wireless signal that is broadcast by the advertising device, to monitor the advertising device. In this solution, advertisement operation personnel do not need to take photos, perform line patrolling, or the like, to reduce human participation. In this way, a case in which accuracy and credibility of a monitoring result are affected due to reasons such as untimely inspection, incorrect information input after inspection, or manual cheating by the advertisement operation personnel can be avoided. In addition, labor costs can be reduced.

In conclusion, according to the method in this application, the advertising device can be monitored at low costs. In addition, accuracy and credibility of the monitoring result can be improved.

With reference to the first aspect, in a possible design, the wireless signal may further include an identifier of an electronic advertisement being played by the advertising device. Correspondingly, the exposure data may further include the identifier of the electronic advertisement. After receiving the exposure data including the identifier of the electronic advertisement, the server may monitor, based on the identifier of the electronic advertisement, whether the advertising device plays the electronic advertisement delivered by the server to the advertising device.

In this design, the server may not only determine, based on the exposure data reported by the mobile terminal, whether the advertising device has been normally installed and put into use, but also determine whether an exception occurs in the electronic advertisement played by the advertising device.

With reference to the first aspect, in another possible design, the exposure data may not only include the identifier of the electronic advertisement, but also include time information. The time information is used to indicate a time at which the mobile terminal detects the wireless signal. After receiving the exposure data including the time information, the server may monitor, based on the time information, whether the advertising device plays the electronic advertisement in a time period specified by the server.

It may be understood that the advertising device may play different electronic advertisements in different time periods. Normally, the advertising device plays the electronic advertisement according to an advertisement play policy indicated by the server. The advertisement play policy may indicate a play time period of the electronic advertisement. The server may compare the time indicated by the time information included in the exposure data with the play time period indicated by the advertisement play policy, and may determine whether the advertising device plays the electronic advertisement according to the advertisement play policy indicated by the server, for example, whether the advertising device plays a specified electronic advertisement in the time period specified by the server.

With reference to the first aspect, in another possible design, the wireless signal may further include bearing information of the advertising device. The bearing information is used to indicate a location (for example, latitude and longitude) and an orientation of the advertising device. Correspondingly, the exposure data may further include the bearing information. After receiving the exposure data including the time information, the server may monitor, based on the bearing information, whether the location and the orientation of installing the advertising device meet requirements.

If the bearing information of the advertising device that is reported by the mobile terminal is the same as bearing information of the advertising device that is stored in the server, it indicates that the advertising device has been normally installed and put into use. If the bearing information of the advertising device that is reported by the mobile terminal is different from the bearing information of the advertising device that is stored in the server, it indicates that an installation exception occurs in the advertising device, that is, the installation of the advertising device does not meet the requirement. In this case, the server may send a prompt indicating that the installation exception occurs in the advertising device, so that the advertisement operation personnel can discover and correct the exception in time.

With reference to the first aspect, in another possible design, the mobile terminal may report the exposure data of the advertising device to the server when determining that the electronic advertisement played by the advertising device generates effective exposure to a user holding the mobile terminal.

Specifically, after detecting the wireless signal, the mobile terminal may collect statistics about first exposure duration of the advertising device for the mobile terminal, and after determining that the first exposure duration is greater than preset exposure duration, send the exposure data of the advertising device to the server.

The first exposure duration is duration in which a bearing of the mobile terminal relative to the advertising device meets a preset condition. That the bearing of the mobile terminal relative to the advertising device meets the preset condition includes: a distance between the mobile terminal and the advertising device is within a preset distance range, the mobile terminal is located on one side of the orientation of the advertising device, and an included angle between a movement direction of the mobile terminal and the orientation of the advertising device is within a preset included angle range.

It may be understood that, if the bearing of the mobile terminal relative to the advertising device meets the preset condition, it indicates that a user holding the mobile terminal may pay attention to the mobile terminal, that is, the advertising device may generate effective exposure to the user holding the mobile terminal. If the bearing of the mobile terminal relative to the advertising device does not meet the preset condition, it indicates that a user holding the mobile terminal does not pay attention to the advertising device, that is, the advertising device does not generate effective exposure to the user holding the mobile terminal.

With reference to the first aspect, in another possible design, the method in which the mobile terminal collects statistics about the first exposure duration of the advertising device for the mobile terminal may include step 1 to step 3. Step 1: The mobile terminal determines whether the bearing of the mobile terminal relative to the advertising device meets the preset condition. After step 1, if the bearing of the mobile terminal relative to the advertising device meets the preset condition, the mobile terminal performs step 2 and step 3. If the bearing of the mobile terminal relative to the advertising device does not meet the preset condition, the mobile terminal continues to collect real-time location information of the mobile terminal. Step 2: The mobile terminal starts timing. Step 3: The mobile terminal determines whether the bearing of the mobile terminal relative to the advertising device meets the preset condition. After step 3, if the bearing of the mobile terminal relative to the advertising device meets the preset condition, the mobile terminal performs step 4. If the bearing of the mobile terminal relative to the advertising device does not meet the preset condition, the mobile terminal performs step 5. Step 4: The mobile terminal continues timing, and performs step 3, Step 5: The mobile terminal obtains timing duration to obtain the first exposure duration, and resets the timing.

This design provides a specific implementation example in which the mobile terminal collects statistics about the first exposure duration of the advertising device for the mobile terminal in this application. Certainly, in this application, the method in which the mobile terminal collects statistics about the first exposure duration of the advertising device for the mobile terminal includes but is not limited to the method in the foregoing example.

With reference to the first aspect, in another possible design, the mobile terminal may detect wireless signals that are broadcast by a plurality of advertising devices. However, some advertising devices may not be delivered by the server. Therefore, the mobile terminal does not need to report exposure data of these advertising devices to the server. The mobile terminal may report exposure data of a to-be-monitored advertising device to the server.

Specifically, the server may send device information of a plurality of to-be-monitored advertising devices to the mobile terminal, where the device information of the plurality of advertising devices includes first identifiers of the plurality of advertising devices. The mobile terminal may receive and store the device information of the plurality of advertising devices. Then, after the mobile terminal detects the wireless signal, the mobile terminal may determine, based on the first identifier in the wireless signal and the first identifiers of the plurality of advertising devices, whether the wireless signal is a wireless signal that is broadcast by any one of the plurality of advertising devices. If the mobile terminal determines that the wireless signal is the wireless signal that is broadcast by any one of the plurality of advertising devices, the mobile terminal may report the exposure data of the advertising device to the server. If the mobile terminal determines that the wireless signal is not the wireless signal that is broadcast by any one of the plurality of advertising devices, the mobile terminal may discard the wireless signal, and does not report the exposure data of the advertising device to the server.

In this design, the mobile terminal detects and reports an exposure event only for the to-be-monitored advertising device indicated by the server. In this way, not only power consumption of the mobile terminal can be reduced, but also the exposure event of the to-be-monitored advertising device indicated by the server can be reported to the server in a targeted manner.

With reference to the first aspect, in another possible design, the device information of the to-be-monitored advertising device may not include the first identifier, but includes a second identifier. The second identifier is a wireless network identifier or prefix information of a wireless network identifier, and the prefix information is the first N characters of the wireless network identifier, where N≥2, and N is a positive integer.

Specifically, the server may send device information of a plurality of to-be-monitored advertising devices to the mobile terminal, where the device information of the plurality of advertising devices includes second identifiers of the plurality of advertising devices. The mobile terminal may receive and store the device information of the plurality of advertising devices. Then, after the mobile terminal detects the wireless signal, the mobile terminal may determine, based on the second identifier in the wireless signal and the second identifiers of the plurality of advertising devices, whether the wireless signal is a wireless signal that is broadcast by any one of the plurality of advertising devices. If the mobile terminal determines that the wireless signal is the wireless signal that is broadcast by any one of the plurality of advertising devices, the mobile terminal may report the exposure data of the advertising device to the server. If the mobile terminal determines that the wireless signal is not the wireless signal that is broadcast by any one of the plurality of advertising devices, the mobile terminal may discard the wireless signal, and does not report the exposure data of the advertising device to the server.

In this design, the mobile terminal detects and reports an exposure event only for the to-be-monitored advertising device indicated by the server. In this way, not only power consumption of the mobile terminal can be reduced, but also the exposure event of the to-be-monitored advertising device indicated by the server can be reported to the server in a targeted manner.

With reference to the first aspect, in another possible design, the device information of the to-be-monitored advertising device may include the first identifier and the second identifier. In this design, the mobile terminal may compare the second identifier of the advertising device that is carried in the wireless signal with a second identifier of the to-be-monitored advertising device, and compare the first identifier of the advertising device that is carried in the wireless signal with a first identifier of the to-be-monitored advertising device. If the second identifier of the advertising device is the same as a second identifier of any to-be-monitored advertising device, and the first identifier of the advertising device is the same as a first identifier of the to-be-monitored advertising device, it indicates that the advertising device is a to-be-monitored advertising device, and the wireless signal is broadcast by the to-be-monitored advertising device.

According to a second aspect, this application provides an advertising device monitoring method. The method may be applied to a mobile terminal. The method may include: The mobile terminal may detect a wireless signal that is broadcast by an advertising device, and then send exposure data of the advertising device to a server. The wireless signal includes a first identifier of the advertising device. Correspondingly, the exposure data includes the first identifier of the advertising device. The exposure data is used by the server to determine that the advertising device is installed and put into use.

In this solution, the mobile terminal reports the exposure data of the advertising device to the server based on the wireless signal that is broadcast by the advertising device, to monitor the advertising device. In this solution, advertisement operation personnel do not need to take photos, perform line patrolling, or the like, to reduce human participation. In this way, a case in which accuracy and credibility of a monitoring result are affected due to reasons such as untimely inspection, incorrect information input after inspection, or manual cheating by the advertisement operation personnel can be avoided. In addition, labor costs can be reduced.

In conclusion, according to the method in this application, the advertising device can be monitored at low costs. In addition, accuracy and credibility of the monitoring result can be improved.

With reference to the second aspect, in a possible design, the wireless signal further includes an identifier of an electronic advertisement being played by the advertising device. Correspondingly, the exposure data may further include the identifier of the electronic advertisement. The identifier of the electronic advertisement is used by the server to monitor whether the advertising device plays the electronic advertisement delivered by the server to the advertising device. For technical effects of this design, refer to related descriptions in the possible design of the first aspect. Details are not described herein again.

With reference to the second aspect, in another possible design, the exposure data may further include time information. The time information is used to indicate a time at which the mobile terminal detects the wireless signal. The time information is used by the server to monitor whether the advertising device plays the electronic advertisement in a time period specified by the server. For technical effects of this design, refer to related descriptions in the possible design of the first aspect. Details are not described herein again.

With reference to the second aspect, in another possible design, the wireless signal may further include bearing information of the advertising device, and the bearing information is used to indicate a location and an orientation of the advertising device. Correspondingly, the exposure data further includes the bearing information. The bearing information is used by the server to monitor whether the location and the orientation of installing the advertising device meet requirements. For technical effects of this design, refer to related descriptions in the possible design of the first aspect. Details are not described herein again.

With reference to the second aspect, in another possible design, the mobile terminal may report the exposure data of the advertising device to the server when determining that the electronic advertisement played by the advertising device generates effective exposure to a user holding the mobile terminal. Specifically, after detecting the wireless signal, the mobile terminal may collect statistics about first exposure duration of the advertising device for the mobile terminal, and after determining that the first exposure duration is greater than preset exposure duration, send the exposure data of the advertising device to the server.

For a method for collecting statistics about the first exposure duration by the mobile terminal and effects of this design, refer to related descriptions in the possible design of the first aspect. Details are not described herein again.

With reference to the second aspect, in another possible design, the wireless signal further includes the preset distance range, the preset included angle range, and the preset exposure duration. That is, the advertising device may broadcast the wireless signal that carries the preset distance range, the preset included angle range, and the preset exposure duration, so that the mobile terminal can determine effective exposure of the advertising device based on the preset distance range, the preset included angle range, and the preset exposure duration.

With reference to the second aspect, in another possible design, the mobile terminal may report, to the server, only exposure data of a to-be-monitored advertising device indicated by the server. For example, the mobile terminal may determine, based on the first identifier of the advertising device, whether the advertising device is the to-be-monitored advertising device.

Specifically, the mobile terminal may receive device information of a plurality of to-be-monitored advertising devices from the server, and store the device information of the plurality of advertising devices. The device information of the plurality of advertising devices may include first identifiers of the plurality of advertising devices. After the mobile terminal detects the wireless signal, the mobile terminal may determine, based on the first identifier in the wireless signal and the first identifiers of the plurality of advertising devices, that the wireless signal is a wireless signal that is broadcast by any one of the plurality of advertising devices, and then send the exposure data of the advertising device to the server. For technical effects of this design, refer to related descriptions in the possible design of the first aspect. Details are not described herein again.

With reference to the second aspect, in another possible design, the mobile terminal may report, to the server, only exposure data of a to-be-monitored advertising device indicated by the server. For example, the mobile terminal may determine, based on a second identifier of the advertising device, whether the advertising device is the to-be-monitored advertising device.

Specifically, the mobile terminal may receive device information of a plurality of to-be-monitored advertising devices from the server, and store the device information of the plurality of advertising devices. The device information of the plurality of advertising devices may include second identifiers of the plurality of advertising devices. After the mobile terminal detects the wireless signal, the mobile terminal may determine, based on the second identifier in the wireless signal and the second identifiers of the plurality of advertising devices, that the wireless signal is a wireless signal that is broadcast by any one of the plurality of advertising devices, and then send the exposure data of the advertising device to the server. For the second identifier and technical effects of this design, refer to related descriptions in the possible design of the first aspect. Details are not described herein again.

With reference to the second aspect, in another possible design, the wireless signal may not include preset distance range, preset included angle range, or preset exposure duration. In this design, the mobile terminal may obtain the preset distance range, the preset included angle range, and the preset exposure duration from the server. For example, the device information of the to-be-monitored advertising device that is received by the mobile terminal from the server may include the preset distance range, the preset included angle range, and the preset exposure duration.

With reference to the second aspect, in another possible design, starting from a time at which the mobile terminal detects the wireless signal, if the mobile terminal detects the wireless signal again within preset duration, the mobile terminal may discard the wireless signal that is detected again. That is, the mobile terminal does not repeatedly report the exposure data of the advertising device to the server within the preset duration.

In this design, the mobile terminal may perform repeated detection on the detected wireless signal. In this way, power consumption of the mobile terminal can be reduced. In addition, a same mobile terminal can be prevented from reporting a plurality of pieces of same exposure data to the server, and accuracy of advertisement effect analysis can be improved.

With reference to the second aspect, in another possible design, if the mobile terminal detects the wireless signal again after the preset duration, the mobile terminal may send the exposure data of the advertising device to the server. In this way, when the advertising device plays different electronic advertisements in different time periods, the mobile terminal may report, to the server, exposure data generated when the advertising device plays the different electronic advertisements.

According to a third aspect, this application provides an advertising device monitoring method. The method may be applied to an advertising device (for example, an advertising device). The method includes: The advertising device may play an electronic advertisement, and the advertising device may further broadcast a wireless signal. The wireless signal includes a first identifier of the advertising device.

After the wireless signal is detected by a mobile terminal, the mobile terminal sends exposure data including the first identifier to a server, so that the server determines that the advertising device is installed and put into use, thereby monitoring the advertising device. In this solution, advertisement operation personnel do not need to take photos, perform line patrolling, or the like, to reduce human participation. In this way, a case in which accuracy and credibility of a monitoring result are affected due to reasons such as untimely inspection, incorrect information input after inspection, or manual cheating by the advertisement operation personnel can be avoided. In addition, labor costs can be reduced.

In conclusion, according to the method in this application, the advertising device can be monitored at low costs. In addition, accuracy and credibility of the monitoring result can be improved.

With reference to the third aspect, in a possible design, the wireless signal may further include an identifier of an electronic advertisement being played by the advertising device. After the wireless signal is detected by the mobile terminal, the mobile terminal sends the exposure data including the identifier of the electronic advertisement to the server, so that the server monitors whether the advertising device plays the electronic advertisement delivered by the server to the advertising device. For technical effects of this design, refer to related descriptions in the possible design of the first aspect. Details are not described herein again.

With reference to the third aspect, in another possible design, the wireless signal may further include bearing information of the advertising device, and the bearing information is used to indicate a location and an orientation of the advertising device. After the wireless signal is detected by the mobile terminal, the mobile terminal sends the exposure data including the bearing information to the server, so that the server monitors whether the location and the orientation of installing the advertising device meet requirements. For technical effects of this design, refer to related descriptions in the possible design of the first aspect. Details are not described herein again.

With reference to the third aspect, in another possible design, the wireless signal further includes a second identifier of the advertising device. The second identifier is a wireless network identifier or prefix information of a wireless network identifier. The prefix information is the first N characters of the wireless network identifier, where N≥2, and N is a positive integer. After the wireless signal is detected by the mobile terminal, the mobile terminal sends the exposure data to the server after determining, based on the second identifier of the advertising device, that the advertising device is a to-be-monitored advertising device indicated by the server. For technical effects of this design, refer to related descriptions in the possible design of the first aspect. Details are not described herein again.

With reference to the third aspect, in another possible design, a camera is installed on the advertising device, and a viewing range of the camera is on a display of the advertising device. The advertising device may collect, by using the camera, image data of the electronic advertisement played by the advertising device. The advertising device may further send the image data collected by the camera to the server.

After the image data is received by the server, the server provides a remote monitoring service of the advertising device based on the image data. For example, the server may provide the remote monitoring service of the advertising device for a brand advertiser based on the foregoing image data. The brand advertiser may view the foregoing image data on an advertising platform provided by the server.

According to a fourth aspect, this application provides an advertising device monitoring method. The method may be applied to a server. The method may include: The server receives exposure data of an advertising device from a mobile terminal, where the exposure data of the advertising device includes a first identifier of the advertising device. The server may determine, based on the first identifier in the exposure data, that the advertising device is installed and put into use.

The exposure data is sent by the mobile terminal to the server after the mobile terminal detects a wireless signal that includes the first identifier and that is sent by the advertising device. That is, in this solution, the mobile terminal reports the exposure data of the advertising device to the server based on the wireless signal that is broadcast by the advertising device, to monitor the advertising device. In this solution, advertisement operation personnel do not need to take photos, perform line patrolling, or the like, to reduce human participation. In this way, a case in which accuracy and credibility of a monitoring result are affected due to reasons such as untimely inspection, incorrect information input after inspection, or manual cheating by the advertisement operation personnel can be avoided. In addition, labor costs can be reduced.

In conclusion, according to the method in this application, the advertising device can be monitored at low costs. In addition, accuracy and credibility of the monitoring result can be improved.

With reference to the fourth aspect, in a possible design, the exposure data may further include bearing information of the advertising device. The bearing information is used to indicate a location and an orientation of the advertising device. The server may monitor, based on the bearing information, whether the location and the orientation of installing the advertising device meet requirements. For technical effects of this design, refer to related descriptions in the possible design of the first aspect. Details are not described herein again.

With reference to the fourth aspect, in another possible design, the exposure data may further include an identifier of an electronic advertisement being played by the advertising device. The server may monitor, based on the identifier of the electronic advertisement, whether the advertising device plays the electronic advertisement delivered by the server to the advertising device. For technical effects of this design, refer to related descriptions in the possible design of the first aspect. Details are not described herein again.

With reference to the fourth aspect, in another possible design, the exposure data may further include time information. The time information is used to indicate a time at which the mobile terminal detects the wireless signal. The server may monitor, based on the time information, whether the advertising device plays the electronic advertisement in a time period specified by the server. For technical effects of this design, refer to related descriptions in the possible design of the first aspect. Details are not described herein again.

With reference to the fourth aspect, in another possible design, the server may further send device information of a plurality of to-be-monitored advertising devices to the mobile terminal, where the device information of the plurality of advertising devices includes first identifiers of the plurality of advertising devices. The exposure data is sent by the mobile terminal to the server after the mobile terminal determines, based on the first identifier in the wireless signal and the first identifiers of the plurality of advertising devices, that the wireless signal is sent by any one of the plurality of advertising devices. For technical effects of this design, refer to related descriptions in the possible design of the first aspect. Details are not described herein again.

With reference to the fourth aspect, in another possible design, the wireless signal may further include a second identifier of the advertising device. The server may further send device information of a plurality of to-be-monitored advertising devices to the mobile terminal, where the device information of the plurality of advertising devices includes second identifiers of the plurality of advertising devices. The exposure data is sent by the mobile terminal to the server after the mobile terminal determines, based on the second identifier in the wireless signal and the second identifiers of the plurality of advertising devices, that the wireless signal is sent by any one of the plurality of advertising devices. For the second identifier and technical effects of this design, refer to related descriptions in the possible design of the first aspect. Details are not described herein again.

With reference to the fourth aspect, in another possible design, the server may receive image data of the electronic advertisement from the advertising device. The image data is collected by a camera installed on the advertising device. The server may provide a remote monitoring service of the advertising device based on the image data. For example, the server may provide the remote monitoring service of the advertising device for a brand advertiser based on the foregoing image data. The brand advertiser may view the foregoing image data on an advertising platform provided by the server.

According to a fifth aspect, this application provides a mobile terminal. The mobile terminal includes one or more processors, a memory, a wireless communications module, and a mobile communications module. The memory, the wireless communications module, and the mobile communications module are coupled to the processor.

The memory is configured to store computer program code. The computer program code includes computer instructions. When the processor executes the computer instructions, the mobile terminal performs the method according to any one of the second aspect or the possible designs of the second aspect.

According to a sixth aspect, this application provides a chip system. The chip system is applied to a mobile terminal, for example, the mobile terminal according to the fifth aspect. The chip system includes one or more interface circuits and one or more processors. The interface circuit and the processor are interconnected through a line. The interface circuit is configured to: receive a signal from a memory of the mobile terminal, and send the received signal to the processor. The signal may include computer instructions stored in the memory. When the processor executes the computer instructions, the mobile terminal may perform the method according to any one of the second aspect or the possible designs of the second aspect.

According to a seventh aspect, this application provides a computer-readable storage medium. The computer-readable storage medium includes computer instructions, and when the computer instructions are on a mobile terminal, the mobile terminal is enabled to perform the method according to any one of the second aspect or the possible designs of the second aspect.

According to an eighth aspect, this application provides an advertising device. The advertising device includes one or more processors, a memory, a display, and a wireless communications module. The memory, the display, and the wireless communications module are coupled to the processor.

The memory is configured to store computer program code, where the computer program code includes computer instructions. The processor is configured to run the computer instructions, so that the advertising device performs the method according to any one of the third aspect or the possible designs of the third aspect.

According to a ninth aspect, this application provides a computer-readable storage medium. The computer-readable storage medium includes computer instructions, and when the computer instructions are run on an advertising device, the advertising device is enabled to perform the method according to any one of the third aspect and the possible designs of the third aspect.

According to a tenth aspect, this application provides a server. The server includes one or more processors, a memory, and a communications module. The memory and the communications module are coupled to the processor.

The memory is configured to store computer program code, where the computer program code includes computer instructions. The processor is configured to run the computer instructions, so that the server performs the method according to any one of the fourth aspect or the possible designs of the fourth aspect.

According to an eleventh aspect, this application provides a computer-readable storage medium. The computer-readable storage medium includes computer instructions, and when the computer instructions are on a server, the server is enabled to perform the method according to any one of the fourth aspect or the possible designs of the fourth aspect.

According to a twelfth aspect, this application provides a computer program product. When the computer program product is run on a computer, the computer is enabled to perform the method according to any one of the second aspect or the possible designs of the second aspect, the method according to any one of the third aspect or the possible designs of the third aspect, or the method according to any one of the fourth aspect or the possible designs of the fourth aspect.

According to a thirteenth aspect, this application provides an advertising system. The advertising system may include an advertising device, a mobile terminal, and a server. The advertising device is configured to broadcast a wireless signal, where the wireless signal includes a first identifier of the advertising device. The mobile terminal is configured to: detect the wireless signal, and send exposure data of the advertising device to the server, where the exposure data includes the first identifier of the advertising device. The server is configured to: receive the exposure data from the mobile terminal, and determine, based on the exposure data, that the advertising device is installed and put into use. For technical effects of the thirteenth aspect, refer to related descriptions in the first aspect. Details are not described herein again.

With reference to the thirteenth aspect, in a possible design, the wireless signal may further include an identifier of an electronic advertisement being played by the advertising device. The exposure data further includes the identifier of the electronic advertisement. Correspondingly, the server may be further configured to monitor, based on the identifier of the electronic advertisement, whether the advertising device plays the electronic advertisement delivered by the server. For technical effects of this design, refer to related descriptions in the possible design of the first aspect. Details are not described herein again.

With reference to the thirteenth aspect, in another possible design, the exposure data may further include time information, and the time information is used to indicate a time at which the mobile terminal detects the wireless signal. The server may be further configured to monitor, based on the time information, whether the advertising device plays the electronic advertisement in a time period specified by the server. For technical effects of this design, refer to related descriptions in the possible design of the first aspect. Details are not described herein again.

With reference to the thirteenth aspect, in another possible design, the wireless signal further includes bearing information of the advertising device, and the bearing information is used to indicate a location and an orientation of the advertising device. The exposure data further includes the bearing information. The server is further configured to monitor, based on the bearing information, whether the location and the orientation of installing the advertising device meet requirements. For technical effects of this design, refer to related descriptions in the possible design of the first aspect. Details are not described herein again.

It should be noted that functions of the advertising device, the mobile terminal, and the server in the advertising system are not limited to the functions according to any one of the thirteenth aspect or the possible designs of the thirteenth aspect. For other functions of the advertising device, the mobile terminal, and the server, refer to descriptions according to the first aspect, the second aspect, the third aspect, the fourth aspect, and any possible design of the foregoing aspects. Details are not described herein again in this application.

It may be understood that, for beneficial effects that can be achieved by the mobile terminal according to the fifth aspect, the chip system according to the sixth aspect, the advertising device according to the eighth aspect, the server according to the tenth aspect, the computer-readable storage medium according to the seventh aspect, the ninth aspect, or the eleventh aspect, the computer program product according to the twelfth aspect, and the advertising system according to the thirteenth aspect, refer to beneficial effects according to the first aspect, the second aspect, the third aspect, the fourth aspect, and any possible design of the foregoing aspects. Details are not described herein again.

DESCRIPTION OF EMBODIMENTS

Figure 1A:
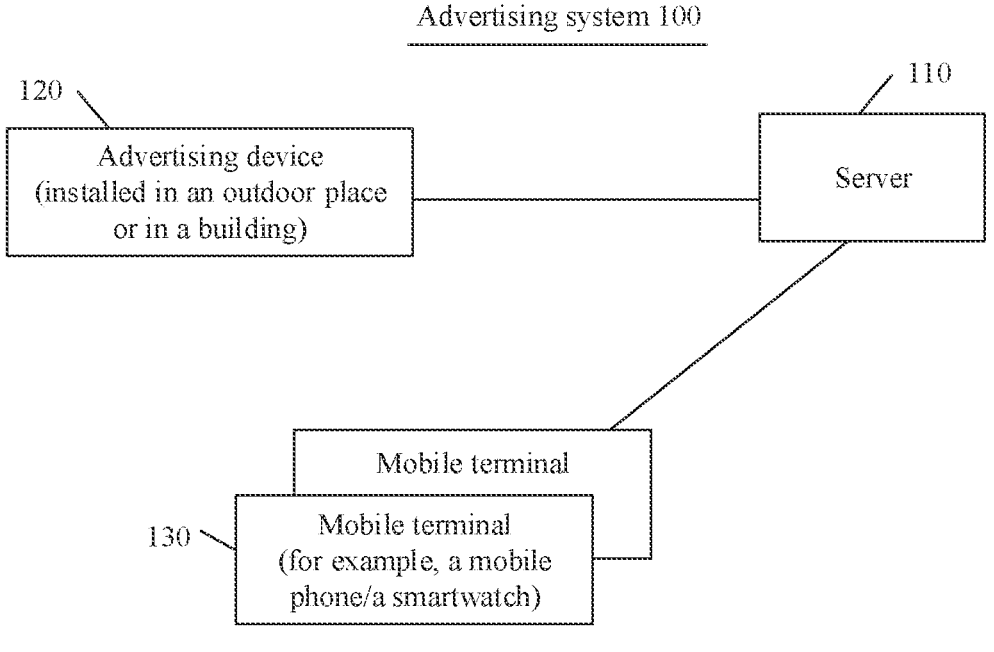
FIG. 1A is a schematic diagram of a system architecture of an advertising system according to an embodiment of this application.

An embodiment of this application provides a method for collecting statistics about exposure data of an electronic advertisement. The method may be applied to an advertising system 100 shown in FIG. 1A. As shown in FIG. 1A, the advertising system 100 may include a server 110, an advertising device 120, and a plurality of mobile terminals 130.

It should be noted that the advertising system 100 may include a plurality of advertising devices 120. FIG. 1A shows an example of an architecture of the advertising system 100 by using only an example in which the advertising system 100 includes one advertising device 120.

The server 110 may provide an advertising platform, to receive an electronic advertisement delivery task triggered by a brand advertiser. The server 110 sends a corresponding advertisement resource to the advertising device 120 based on the advertisement delivery task, and indicates the advertising device 120 to play an electronic advertisement corresponding to the advertisement resource. The advertisement resource may be advertisement content of the advertisement, or may be a link for downloading advertisement content. For example, the server 110 may maintain an advertisement resource pool. The advertisement resource pool stores advertisement resources delivered by all brand advertisers.

Figure 1B:
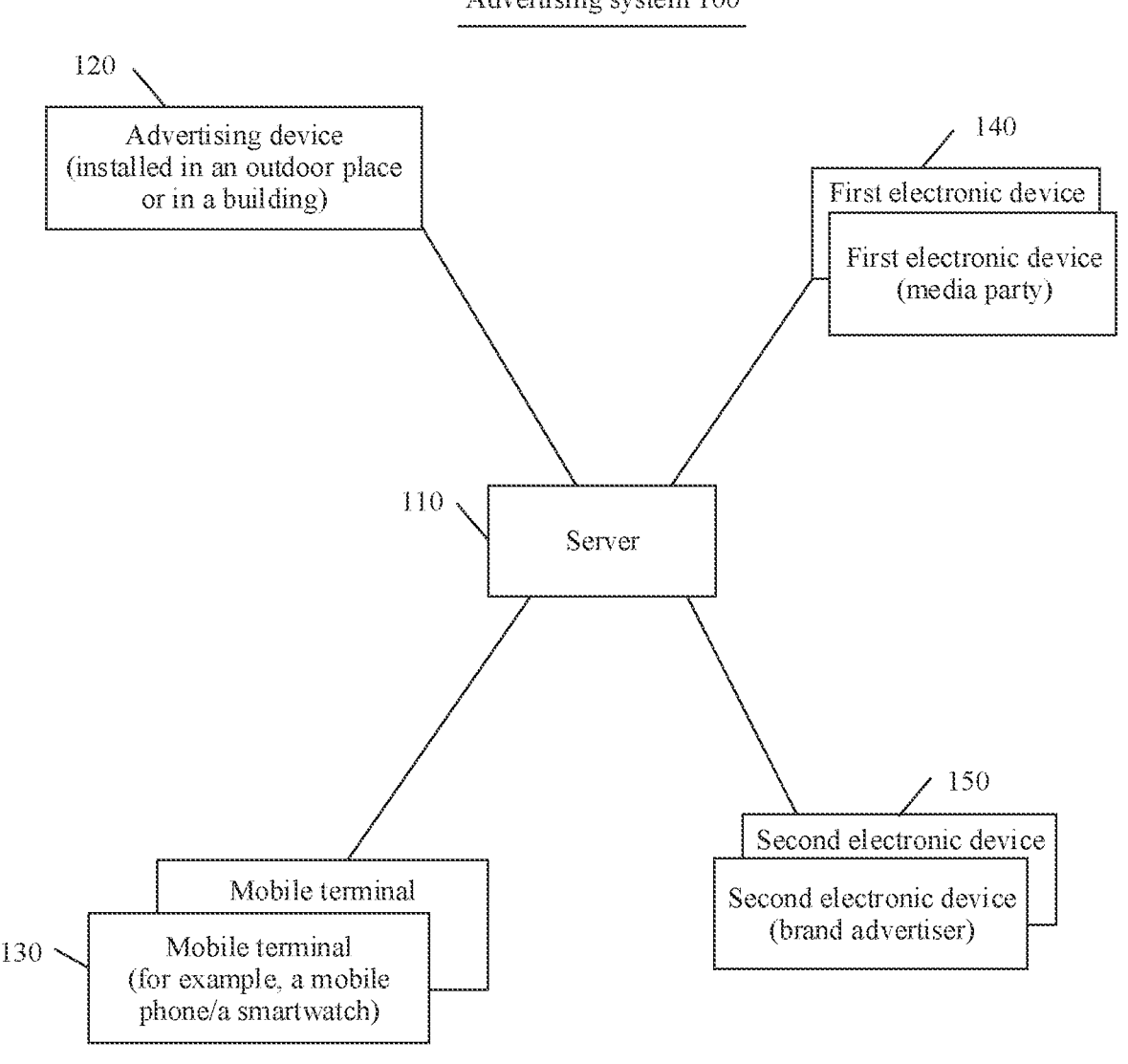
FIG. 1B is a schematic diagram of a system architecture of an advertising system according to an embodiment of this application.

For example, as shown in FIG. 1B, the advertising system may further include a first electronic device 140 and a second electronic device 150. The server 110 provides an advertising platform, and the advertising platform provides an advertisement slot (that is, an advertising device) registration service for a media party, and provides an advertisement delivery service for a brand advertiser.

For example, that the server 110 provides an advertising platform to provide an advertisement delivery service for a brand advertiser may specifically include: A web page corresponding to the advertising platform provided by the server 110 can be logged in by the second electronic device 150 of the brand advertiser to provide the advertisement delivery service for the brand advertiser. Alternatively, the server 110 serves as a server of a second app (application, APP) corresponding to the advertising platform, and provides the advertisement delivery service for the brand advertiser through the second app installed on the second electronic device 150. The brand advertiser may trigger an electronic advertisement delivery task to the server 110 by using the second electronic device 150.

That the server 110 provides an advertising platform to provide an advertisement slot (that is, advertising device) registration service for a media party may specifically include: The server 110 serves as a server of a web page of the advertising platform, so that the first electronic device 140 of the media party can log in to the server to provide the advertisement slot registration service for the media party. Alternatively, the server 110 serves as a server of a first app of the advertising platform, and provides the advertisement slot registration service for the media party through the first app installed on the first electronic device 140. After registering with the advertising platform by using the first electronic device 140, the media party may register an advertisement slot with the server 110, that is, indicate, to the server 110, an advertisement slot that can be used for delivery of an advertisement. For example, the advertisement slot may include the advertising device 120 (for example, an electronic billboard), a location that is in an app and that is used to play the advertisement (for example, a launch page of the app), and a location that is in a web page and that is used to play the advertisement.

For example, the server 110 may be an advertisement server or an application server, or may be another type of server. This is not limited in this embodiment of this application. The server 110 may be one server. Alternatively, the server 110 may be a server cluster including a plurality of servers. Each server in the server cluster may manage a plurality of advertising devices 120. For example, each server in the server cluster may manage a plurality of advertising devices 120 in different areas.

Figure 4:
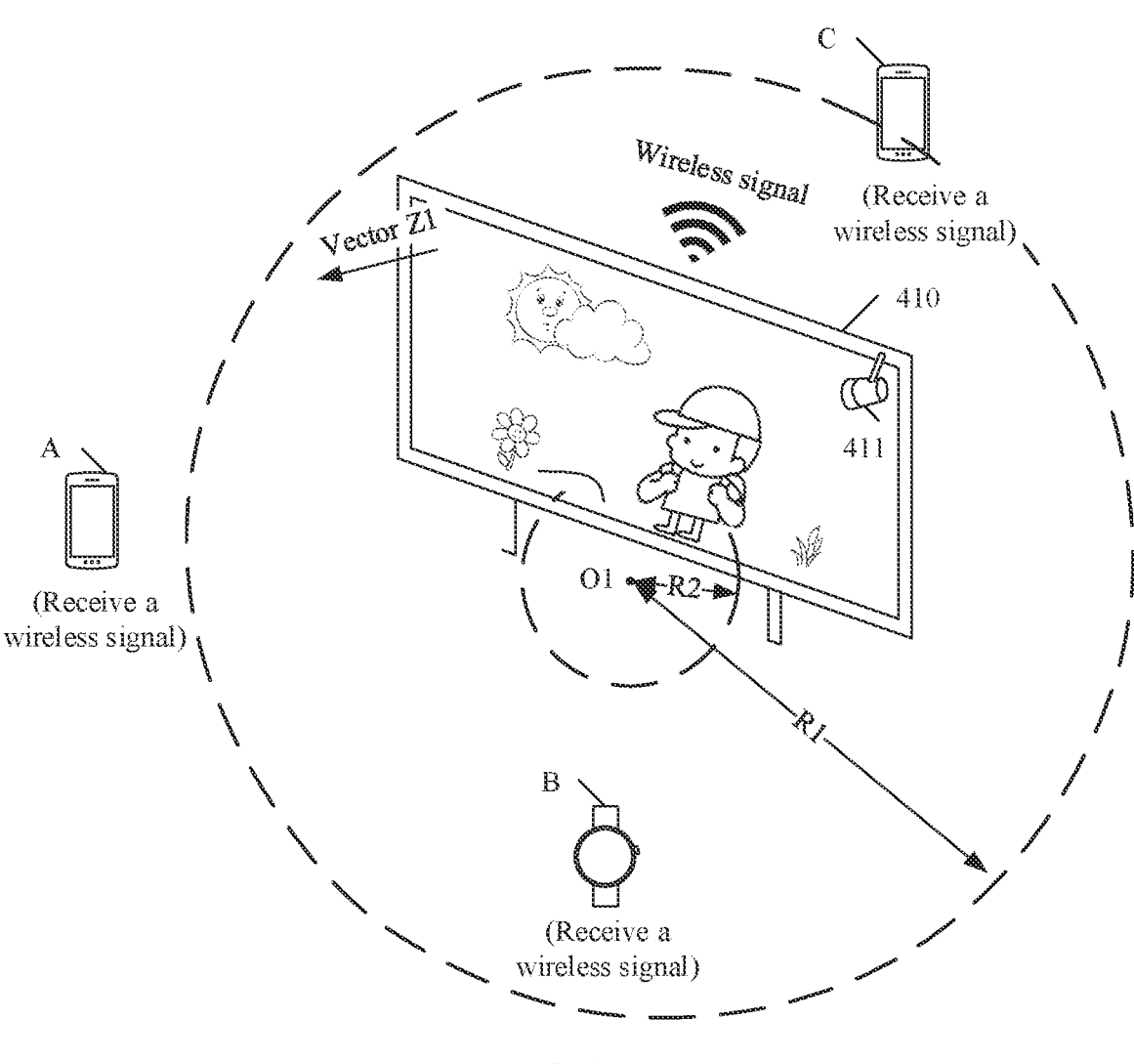
FIG. 4 is a schematic diagram of a scenario to which a method is applied according to an embodiment of this application.
Figure 5:
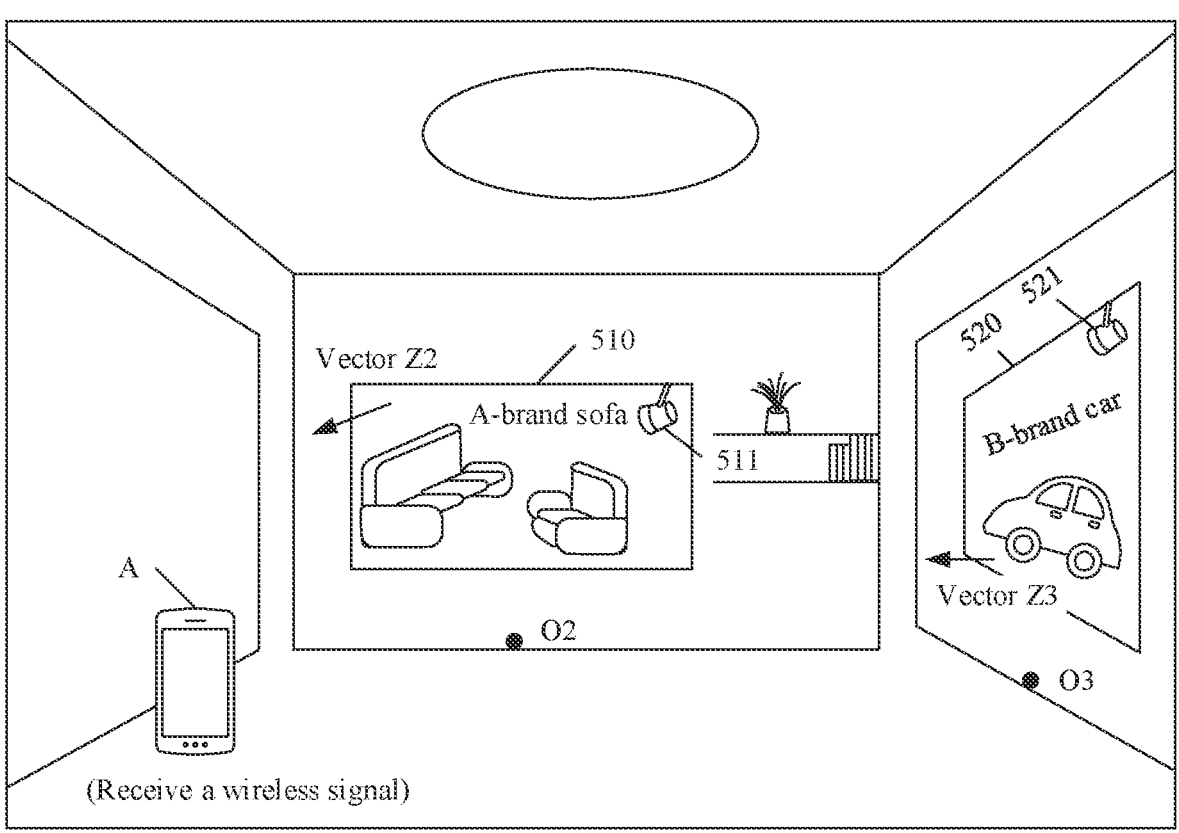
FIG. 5 is a schematic diagram of another scenario to which a method is applied according to an embodiment of this application.

The advertising device (for example, the advertising device 120) in this embodiment of this application may be installed in public space, and is a device configured to play an electronic advertisement. For example, the advertising device 120 may be an electronic billboard installed in public space. The public space may include places such as an outdoor place (for example, a roadside) and a building (for example, an elevator room). For example, the advertising device 120 may be an electronic billboard 410 installed in an outdoor place that is shown in FIG. 4. For another example, the advertising devices 120 may be electronic billboards 510 and 520 installed in a building that are shown in FIG. 5. The advertising device 120 may include components such as a display and an audio player (for example, a speaker). These devices can work together to play an electronic advertisement. Specifically, the advertising device 120 may play the electronic advertisement according to a specific play policy. For example, the play policy may indicate a play time period and a quantity of play times of the electronic advertisement.

In an implementation, an advertisement resource of the electronic advertisement played by the advertising device 120 may be received from the server 110. For example, the server 110 may receive settings of advertisement operation personnel, determine an electronic advertisement to be played by each advertising device 120 and a play policy of the electronic advertisement, and then send, to the advertising device 120, an advertisement resource and advertisement policy information that are of the electronic advertisement and that are set by the advertisement operation personnel for the advertising device 120. The advertisement policy information is used to indicate the play policy of the electronic advertisement. For another example, the advertising device 120 may further request an electronic advertisement from the server 110; and the server 110 may return a corresponding advertisement resource and corresponding advertisement policy information to the advertising device 120 based on the request of the advertising device 120.

In another implementation, an advertisement resource and advertisement policy information of the electronic advertisement played by the advertising device 120 may be manually added by advertisement operation personnel of the server 110 to the advertising device 120. For example, the advertisement operation personnel may go to an installation place of the advertising device 120, and add or update an electronic advertisement to/for the advertising device 120 through a data interface on the advertising device 120, for example, a universal serial bus (USB) interface.

In this embodiment of this application, the advertising device 120 may broadcast a wireless signal. The wireless signal may include data such as an identifier of the advertising device 120. The mobile terminal 130 may listen to the wireless signal. The mobile terminal 130 may listen to the wireless signal. After detecting the wireless signal that is broadcast by the advertising device 120, the mobile terminal 130 may report exposure data of the advertising device 120 to the server 110. For example, the exposure data may include the data such as the identifier of the advertising device 120. In this way, the server 110 may analyze exposure data of each advertising device 120 that is reported by the plurality of mobile terminals 130, to obtain an installation status of each advertising device 120. For example, if the server 110 may receive exposure data of a same advertising device 120 (for example, an identifier of the advertising device 120) that is reported by the plurality of mobile terminals 130, the server 110 may determine that the advertising device 120 has been installed and put into use.

Optionally, the wireless signal may further include an identifier of the electronic advertisement being played by the advertising device 120. Correspondingly, the exposure data further includes the identifier of the electronic advertisement and time information. The time information is used to indicate a time at which the mobile terminal 130 detects the wireless signal. The advertising device 120 needs to play a specified electronic advertisement in a time period specified by the server 110. However, in an actual working process, the advertising device 120 does not necessarily play the specified electronic advertisement in the time period specified by the server 110. In this embodiment of this application, the server 110 may compare whether a time indicated by the time information in the exposure data is consistent with a time specified by the server 110, to determine whether the advertising device 120 plays the electronic advertisement in the time period specified by the server 110. That is, the server 110 may further analyze the exposure data to determine a delivery status of the electronic advertisement on the advertising device 120.

In conclusion, according to the method in this embodiment of this application, the exposure data may be reported to the server by using the mobile terminal of the user, to monitor the advertising device 120. In this solution, advertisement operation personnel do not need to take photos, perform line patrolling, or the like, to reduce human participation. In this way, a case in which accuracy and credibility of a monitoring result are affected due to reasons such as untimely inspection, incorrect information input after inspection, or manual cheating by the advertisement operation personnel can be avoided. In addition, labor costs can be reduced.

In conclusion, according to the method in this embodiment of this application, the advertising device 120 can be monitored at low costs. In addition, accuracy and credibility of the monitoring result can be improved.

For example, the server 110 may be an advertisement server or an application server of an advertiser, or may be another type of server. This is not limited in this embodiment of this application. The server 110 may be one server. Alternatively, the server 110 may be a server cluster including a plurality of servers. Each server in the server cluster may manage a plurality of electronic billboards. For example, each server in the server cluster may manage a plurality of electronic billboards in different regions.

For example, the mobile terminal 130 may be a device such as a mobile phone, a tablet computer, a wearable device (for example, a smartwatch), a laptop computer, a handheld computer, a notebook computer, an ultra-mobile personal computer (UMPC), a netbook, a cellular phone, a personal digital assistant (PDA), a vehicle-mounted device, or an augmented reality (AR)/virtual reality (VR) device. A specific form of the mobile terminal is not specially limited in this embodiment of this application.

Figure 2A:
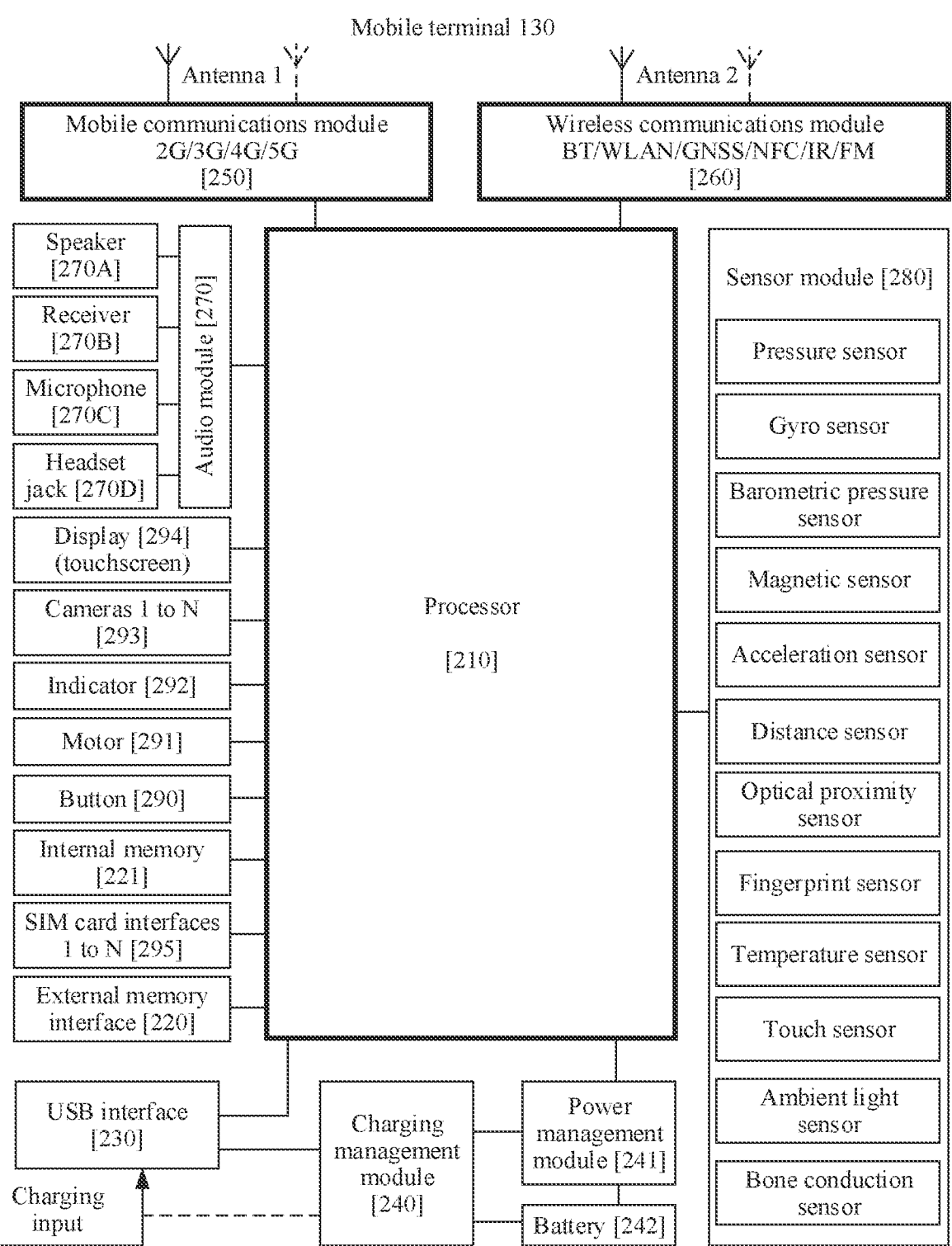
FIG. 2A is a schematic diagram of a hardware structure of a mobile terminal according to an embodiment of this application.

The following describes a hardware structure of the mobile terminal by using an example in which the mobile terminal 130 is a mobile phone. As shown in FIG. 2A, the mobile terminal 130 may include a processor 210, an external memory interface 220, an internal memory 221, a universal serial bus (USB) interface 230, a charging management module 240, a power management module 241, a battery 242, an antenna 1, an antenna 2, a mobile communications module 250, a wireless communications module 260, an audio module 270, a speaker 270A, a receiver 270B, a microphone 270C, a headset jack 270D, a sensor module 280, a button 290, a motor 291, an indicator 292, a camera 293, a display 294, a subscriber identification module (SIM) card interface 295, and the like.

The sensor module 280 may include sensors such as a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, and a bone conduction sensor.

It may be understood that the structure shown in this embodiment does not constitute a specific limitation on the mobile terminal 130. In some other embodiments, the mobile terminal 130 may include more or fewer components than those shown in the figure, or may combine some components, or may split some components, or may have different component arrangements. The components shown in the figure may be implemented by using hardware, software, or a combination of software and hardware.

The processor 210 may include one or more processing units. For example, the processor 210 may include an application processor (AP), a modem processor, a graphics processing unit (GPU), an image signal processor (TSP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the mobile terminal 130. The controller may generate an operation control signal based on instruction operation code and a time sequence signal, to complete control of instruction reading and instruction execution.

A memory may be further disposed in the processor 210, and is configured to store instructions and data. In some embodiments, the memory in the processor 210 is a cache. The memory may store instructions or data just used or cyclically used by the processor 210. If the processor 210 needs to use the instructions or the data again, the processor 210 may directly invoke the instructions or the data from the memory. This avoids repeated access, reduces a waiting time of the processor 210, and improves system efficiency.

In some embodiments, the processor 210 may include one or more interfaces. It may be understood that an interface connection relationship between the modules shown in this embodiment is merely an example for description, and does not constitute a limitation on the structure of the mobile terminal 130. In some other embodiments, the mobile terminal 130 may alternatively use an interface connection manner different from that in the foregoing embodiment, or a combination of a plurality of interface connection manners.

The charging management module 240 is configured to receive a charging input from a charger a charging input of a wired charger and/or a wireless charging input) to charge the battery 242. The charger may be a wireless charger or a wired charger. When charging the battery 242, the charging management module 240 may further supply power to the electronic device by using the power management module 241.

The power management module 241 is configured to connect to the battery 242, the charging management module 240, and the processor 210. The power management module 241 receives an input from the battery 242 and/or the charging management module 240, and supplies power to the processor 210, the internal memory 221, the external memory, the display 294, the camera 293, the wireless communications module 260, and the like. In some embodiments, the power management module 241 may alternatively be disposed in the processor 210. In some other embodiments, the power management module 241 and the charging management module 240 may alternatively be disposed in a same device.

A wireless communication function of the mobile terminal 130 may be implemented by using the antenna 1, the antenna 2, the mobile communications module 250, the wireless communications module 260, the modem processor, the baseband processor, and the like. The antenna 1 and the antenna 2 are configured to transmit and receive an electromagnetic wave signal. In some embodiments, in the mobile terminal 130, the antenna 1 is coupled to the mobile communications module 250, and the antenna 2 is coupled to the wireless communications module 260, so that the mobile terminal 130 can communicate with a network and another device by using a wireless communications technology. The wireless communications technology may include a global navigation satellite system (GNSS), a wireless local area network (WLAN) (for example, a Wi-Fi network) technology, and the like. The GNSS may include a global positioning system (GPS), a global navigation satellite system (GLONASS), a BeiDou navigation satellite system (BDS), a quasi-zenith satellite system (QZSS), a satellite based augmentation system (SBAS), and/or the like. For example, the mobile terminal 130 may obtain real-time location information of the mobile terminal 130 by using a positioning technology such as the GPS, the BDS, or the SBAS.

The mobile communications module 250 may provide a solution to wireless communication that includes 2G/3G/4G/5G or the like and that is applied to the mobile terminal 130. Fax example, the mobile terminal 130 may report the foregoing exposure data to the advertising platform by using the mobile communications module 250.

The wireless communications module 260 may provide a wireless communication solution that is applied to the mobile terminal 130 and that includes a WLAN (for example, a Wi-Fi network), Bluetooth (BT), a GNSS, or the like. For example, the mobile terminal 130 may obtain the real-time location information of the mobile terminal 130 by using a GNSS positioning technology. For example, the mobile terminal 130 may receive, by using the wireless communications module 260 (for example, a Wi-Fi module or a Bluetooth module), a wireless signal that is broadcast by an electronic billboard.

Figure 2B:
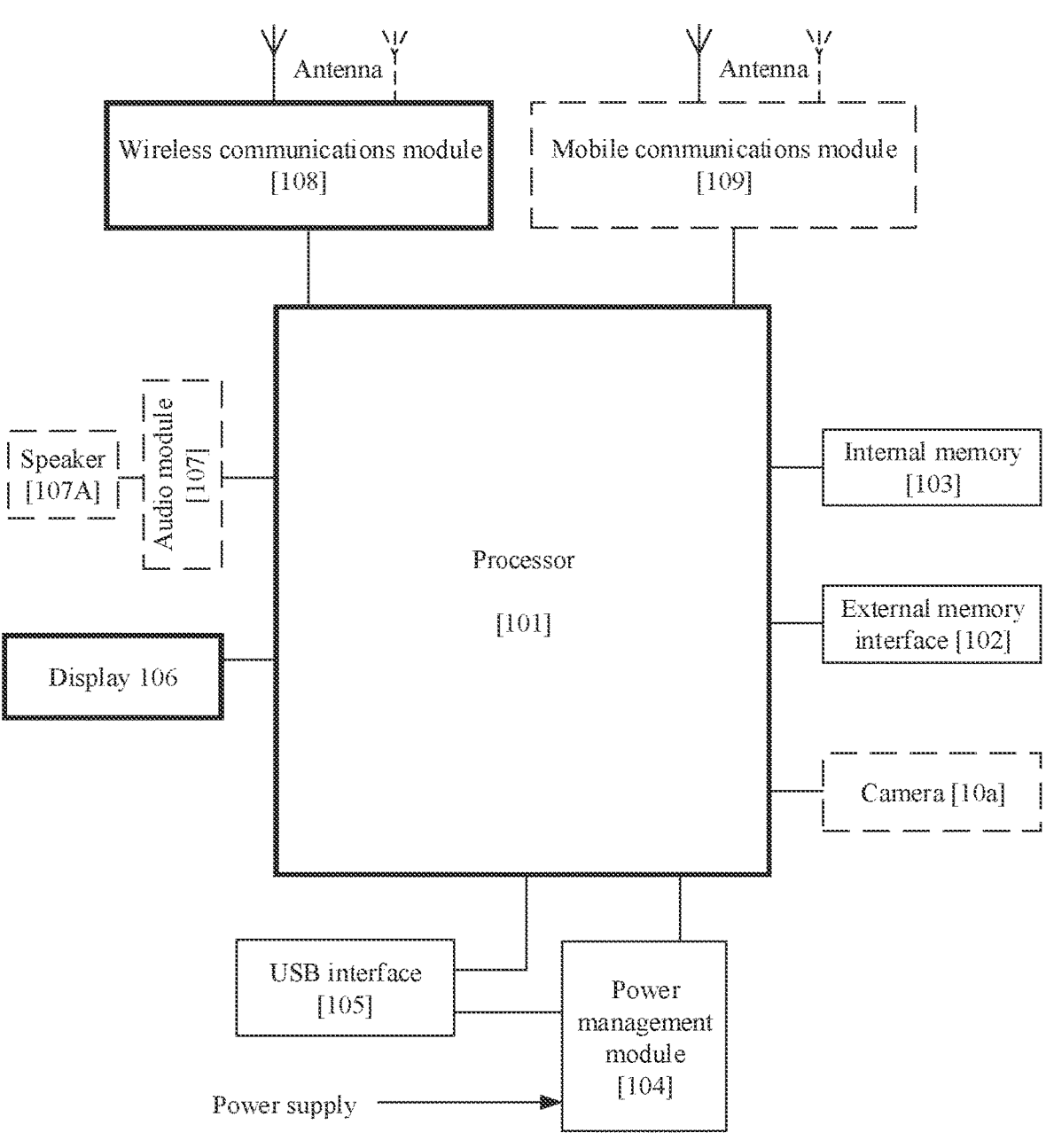
FIG. 2B is a schematic diagram of a hardware structure of an advertising device according to an embodiment of this application.

The mobile terminal 130 implements a display function by using the GPU, the display 294, the application processor, and the like. The mobile terminal 130 may implement a photographing function by using the ISP, the camera 293, the video codec, the GPU, the display 294, the application processor, and the like. The external memory interface 220 may be configured to connect to an external storage card such as a micro SD card, to extend a storage capability of the mobile terminal 130. The internal memory 221 may be configured to store computer-executable program code, where the executable program code includes instructions. The processor 210 performs various function applications of the mobile terminal 130 and data processing by running the instructions stored in the internal memory 221. The mobile terminal 130 may implement an audio function by using the audio module 270, the speaker 270A, the receiver 270B, the microphone 270C, the headset jack 270D, the application processor, and the like FIG. 2B is a schematic diagram of a structure of an advertising device 120 according to an embodiment of this application. As shown in FIG. 2B, the advertising device 120 may include a processor 101, an external memory interface 102, an internal memory 103, a USB interface 105, a power management module 104, an antenna, a wireless communications module 108, a display 106, and the like.

The processor 101 may include one or more processing units. For example, the processor 101 may include an AP, a modem processor, a GPU, an ISP, a controller, a video codec, a DSP, a baseband processor, and/or an NPU. Different processing units may be independent components, or may be integrated into one or more processors. A memory may alternatively be disposed in the processor 101, and is configured to store instructions and data.

The power management module 104 is configured to connect to a power supply. The power management module 104 may be further connected to the processor 101, the internal memory 103, the display 106, the wireless communications module 108, and the like. The power management module 104 receives an input of the power supply through the USB interface 105, and supplies power to the processor 101, the internal memory 103, the display 106, the wireless communications module 108, and the like. In some embodiments, the power management module 104 may alternatively be disposed in the processor 101.

A wireless communication function of the electronic billboard may be implemented by using the antenna, the wireless communications module 108, and the like. The wireless communications module 108 may provide a wireless communication solution that is applied to the electronic billboard and that includes a WLAN (for example, a network), Bluetooth (BT), a GNSS, or the like.

The wireless communications module 108 may be one or more devices that integrate at least one communications processor module. The wireless communications module 108 receives an electromagnetic wave through the antenna, performs frequency modulation and filtering processing on an electromagnetic wave signal, and sends a processed signal to the processor 101. The wireless communications module 108 may further receive a to-be-sent signal front the processor 101, perform frequency modulation and amplification on the signal, and convert a processed signal into an electromagnetic wave for radiation through the antenna. In some embodiments, the antenna and the wireless communications module 108 in the electronic billboard are coupled, so that the electronic billboard can communicate with a network and another device by using a wireless communications technology. For example, the wireless communications module 108 in this embodiment of this application may be a Bluetooth module or a Wi-Fi module. The wireless communications module 108 is configured to broadcast a wireless signal in this embodiment of this application.

Optionally, as shown in FIG. 2B, the advertising device 120 may further include a mobile communications module 109. The mobile communications module 109 may be configured to receive related data of an electronic advertisement from the server 110, for example, an advertisement resource of the electronic advertisement and indication information of a playing policy.

The electronic billboard implements a display function by using the GPU, the display 106, the application processor, and the like. The GPU is a microprocessor for image processing, and connects the display 106 to the application processor. The GPU is configured to: perform mathematical and geometric computation, and render an image. The processor 101 may include one or more GPUs that execute program instructions to generate or change display information.

The display 106 is configured to display an image, a video, and the like. The display 106 includes a display panel. The display panel may be an LCD, an OLED, an AMOLED, an FLED, a Miniled, a Microled, a MicrooLed, a OLED, or the like. For example, in embodiments of this application, the display 106 is configured to display an advertisement.

The video codec is configured to compress or decompress a digital video. The electronic billboard may support one or more video codecs. In this way, the electronic billboard may play or record videos in a plurality of coding formats, for example, MPEG1, MPEG2, MPEG3, and MPEG4.

The internal memory 103 may be configured to store computer-executable program code, where the executable program code includes instructions. The processor 101 performs various function applications of the electronic billboard and data processing by running the instructions stored in the internal memory 103. The internal memory 103 may include a program storage area and a data storage area. The program storage area may store an operating system, an application required by at least one function (for example, a sound playing function or an image playing function), and the like. The data storage area may store data (for example, an advertisement play record or a received advertisement resource) created during use of the electronic billboard. In addition, the internal memory 103 may include a high-speed random access memory, or may include a nonvolatile memory, for example, at least one magnetic disk storage device, a flash storage device, or a UFS.

The external memory interface 102 may be configured to connect to an external storage card, for example, a micro SD card, to extend a storage capability of the advertising device 120. The external storage card communicates with the processor 101 through the external memory interface 102, to implement a data storage function. For example, data such as music, a photo, and a video is stored in the external memory card.

Optionally, as shown in FIG. 2B, the advertising device 120 may further include an audio module 107 and a speaker 107A. For example, an electronic billboard (that is, the advertising device 120) in an elevator room may include an audio module 107 and a speaker 107A. The advertising device 120 may implement an audio function by using the audio module 107, the speaker 107A, the application processor, and the like.

Optionally, as shown in FIG. 2B, the advertising device 120 may further include a camera 10a. The camera 10a is configured to monitor an electronic advertisement played by the advertising device 120. For example, a camera 411 is installed on the electronic billboard 410 shown in FIG. 4. For example, an orientation of a lens of the camera 10a, may be aligned with a display of the advertising device 120, to collect an image of the electronic advertisement played by the advertising device 120. For example, when a camera is installed on the advertising device 120, the camera may be adjusted to control a viewing range of the camera to be on the display of the advertising device 120.

It should be noted that, to avoid infringing user privacy because the camera 10a installed on the advertising device 120 monitors and identifies a surrounding user, when the camera 10a is installed on the advertising device 120, the lens of the camera needs to be prevented from aiming at a location around the advertising device 120 at which a user may pass.

It may be understood that the structure shown in this embodiment does not constitute a specific limitation on the advertising device 120. In some other embodiments, the advertising device 120 may include more or fewer components than those shown in the figure, or may combine some components, or may split some components, or may have different component arrangements. The components shown in the figure may be implemented by using hardware, software, or a combination of software and hardware.

All methods in the following embodiments may be implemented in the mobile terminal 130 having the foregoing hardware structure and the advertising device 120 having the foregoing hardware structure.

Figure 3:
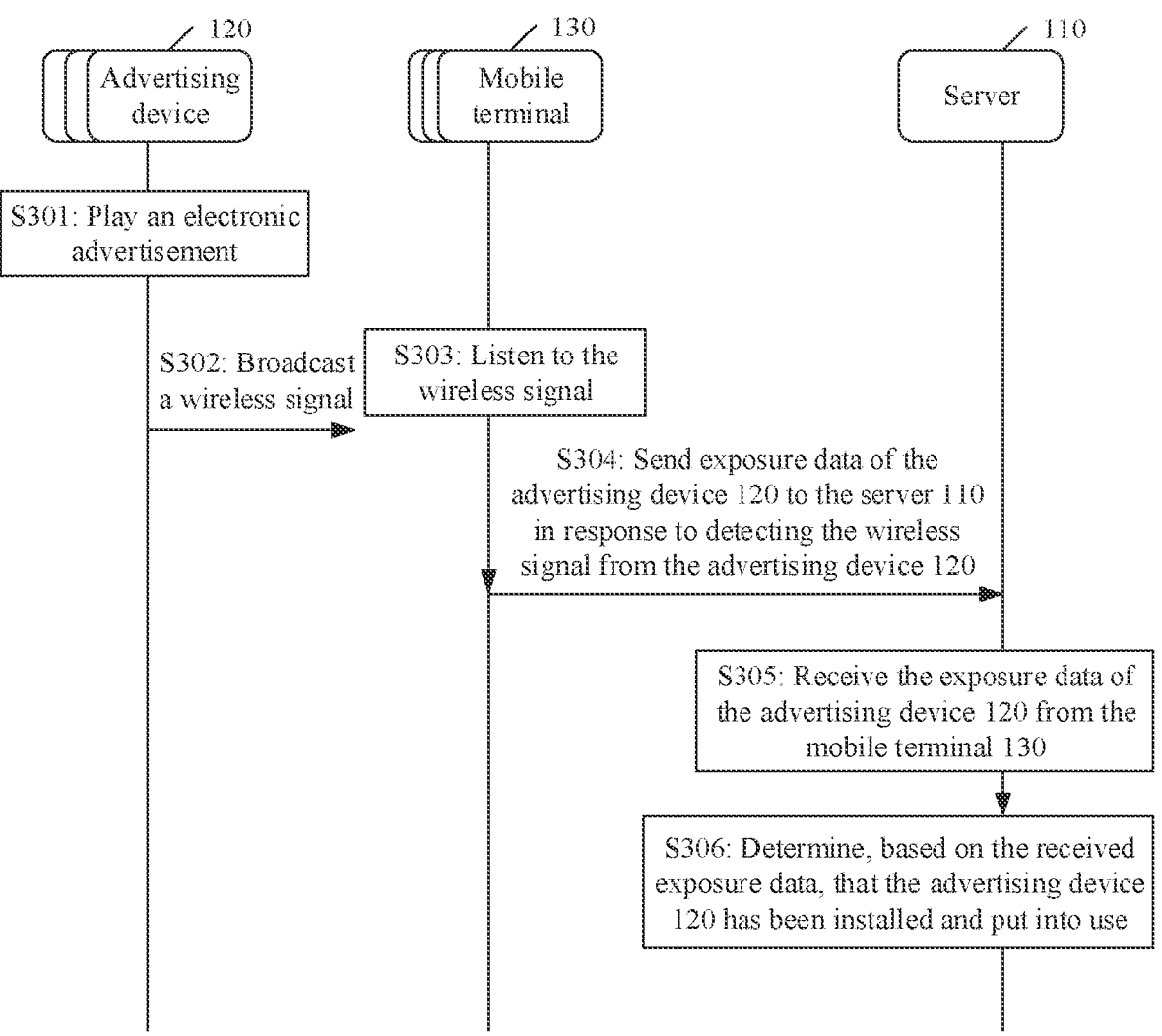
FIG. 3 is a flowchart of an advertising device monitoring method according to an embodiment of this application.

An embodiment of this application provides an advertising device monitoring method. As shown in FIG. 3, the method may include S301 to S306.

S301: The advertising device 120 plays an electronic advertisement.

It may be understood that one advertising device (for example, an electronic billboard) may play one or more electronic advertisements. It is assumed that the advertising device 120 stores advertisement resources of a plurality of electronic advertisements. The advertising device 120 may play the plurality of electronic advertisements according to play policies of the plurality of electronic advertisements. For example, the advertising device 120 maw sequentially and cyclically play the plurality of electronic advertisements in a play sequence indicated by the play policies. For another example, the advertising device 120 may play different electronic advertisements in the plurality of electronic advertisements in different time periods based on play time periods of the electronic advertisements that are indicated by the play policies. For still another example, the advertising device 120 may play the plurality of electronic advertisements based on quantities of play times of the electronic advertisements that are indicated by the play policies. For sources of the advertisement resources that are of the plurality of electronic advertisements and that are stored in the advertising device 120, refer to detailed descriptions in the foregoing embodiment. Details are not described herein again in this embodiment of this application.

S302: The advertising device 120 broadcasts a wireless signal.

It may be understood that the advertising device 120 may include a wireless communications module. For example, the wireless communications module may be a Bluetooth module, and the wireless signal is a Bluetooth signal, for example, a Bluetooth beacon frame. For another example, the wireless communications module may be a Wi-Fi module, and the wireless signal is a Wi-Fi signal, for example, a Wi-Fi beacon frame.

The wireless signal that is broadcast by the advertising device 120 may include a first identifier (identity, ID) of the advertising device 120. The first identifier (identity, ID) of the advertising device 120 is used to uniquely identify the advertising device 120.

The first identifier of the advertising device 120 may be configured by the server 110 for the advertising device 120, and the server 110 may configure different first identifiers for different advertising devices.

For example, the server 110 may configure the first identifier for the advertising device 120 based on an area (for example, a block, a road section, or an administrative region) in which the advertising device 120 is located and a number of the advertising device 120 in the area. For example, the first identifier of the advertising device 120 may be Xi'an City South Second Ring Road West Section 15. "Xi'an City South Second Ring Road West Section" may be the area in which the advertising device 120 is located. A plurality of advertising devices may be installed in the area "Xi'an City South Second Ring Road West Section", and "15" is a number of the advertising device 120 in the area in which the plurality of advertising devices are installed.

For another example, the first identifier of the advertising device 120 may be a group of characters or a character string. The server 110 may configure different characters or character strings for different advertising devices to identify the advertising devices.

Alternatively, the first identifier of the advertising device 120 may be configured in the advertising device 120 when the advertising device 120 is delivered from a factory. For example, the first identifier of the advertising device 120 may be a media access control (MAC) address of the advertising device 120.

It should be noted that, the first identifier of the advertising device 120 includes but is not limited to the foregoing two cases. Any identifier that can be used to identify the advertising device 120 to enable the server 110 and/or the mobile terminal 130 to identify the advertising device 120 can be used as the first identifier of the advertising device 120. Specific content of the first identifier of the advertising device 120 is not limited in this embodiment of this application.

For example, FIG. 4 is a schematic diagram of a scenario to which a method is applied according to an embodiment of this application. The advertising device 120 may be the electronic billboard 410 shown in FIG. 4. The electronic billboard 410 is installed in an outdoor place. The electronic billboard 410 may broadcast a wireless signal, and the wireless signal includes a first identifier of the electronic billboard 410.

For another example, FIG. 5 is a schematic diagram of another scenario to which a method is applied according to an embodiment of this application. The advertising devices 120 may be the electronic billboards 510 and 520 shown in FIG. 5. The electronic billboards 510 and 520 are installed in a building (for example, an indoor place). The electronic billboard 510 may broadcast a wireless signal, and the wireless signal includes a first identifier of the electronic billboard 510. The electronic billboard 520 may broadcast a wireless signal, and the wireless signal includes a first identifier of the electronic billboard 520.

S303: The mobile terminal 130 listens to the wireless signal.

After a wireless communication function (for example, a Bluetooth function or a Wi-Fi function) of the mobile terminal 130 is enabled, the mobile terminal 130 may listen to a wireless signal that is broadcast by another device. For example, a Bluetooth module of the mobile terminal 130 may listen to a Bluetooth signal that is broadcast by another device, for example, a Bluetooth beacon frame. For another example, a Wi-Fi module of the mobile terminal 130 may listen to a Wi-Fi signal that is broadcast by another device, for example, a Wi-Fi beacon frame.

S304: The mobile terminal 130 sends exposure data of the advertising device 120 to the server 110 in response to detecting the wireless signal from the advertising device 120.

For example, a mobile phone A, a smartwatch B, and a mobile phone B shown in FIG. 4 may all detect the wireless signal that is broadcast by the electronic billboard 410. A mobile phone A shown in FIG. 5 may detect the wireless signal that is broadcast by the electronic billboard 510 or 520.

The wireless signal includes the first identifier of the advertising device 120. Correspondingly, the exposure data of the advertising device 120 may include the first identifier of the advertising device 120.

If the mobile terminal 130 monitors the wireless signal from the advertising device 120, the mobile terminal 130 may report an exposure event of the advertising device 120 to the server 110. The exposure event carries the exposure data of the advertising device 120.

S305: The server 110 receives the exposure data of the advertising device 120 from the mobile terminal 130.

The plurality of mobile terminals 130 may report exposure events of the advertising device 120 to the server 110. That is, the server 110 may receive the exposure events from the plurality of mobile terminals 130. Each exposure event includes the exposure data of the advertising device 120.

S306: The server 110 determines, based on the received exposure data, that the advertising device 120 has been installed and put into use.

The first identifier of the advertising device 120 may be used to identify the advertising device 120. Therefore, after receiving the exposure data (including the first identifier of the advertising device 120) of the advertising device 120, the server 110 may determine that the advertising device 120 has been installed and put into use.

An embodiment of this application provides an advertising device monitoring method. The advertising device 120 may broadcast a wireless signal. After detecting the wireless signal, the mobile terminal 130 may report exposure data of the advertising device 120 to the server 110. The exposure data may include a first identifier of the advertising device 120. In this way, the server 110 may analyze exposure data of each advertising device 120 that is reported by the plurality of mobile terminals 130, to obtain an installation status of each advertising device 120, and determine whether the advertising device 120 is installed and put into use.

In this embodiment of this application, the mobile terminal 130 reports the exposure data of the advertising device 120 to the server 110 based on the wireless signal that is broadcast by the advertising device 120, to monitor the advertising device 120. In this solution, advertisement operation personnel do not need to take photos, perform line patrolling, or the like, to reduce human participation. In this way, a case in which accuracy and credibility of a monitoring result are affected due to reasons such as untimely inspection, incorrect information input after inspection, or manual cheating by the advertisement operation personnel can be avoided. In addition, labor costs can be reduced.

In conclusion, according to the method in this embodiment of this application, the advertising device 120 can be monitored at low costs. In addition, accuracy and credibility of the monitoring result can be improved.

In some embodiments, the wireless signal may include not only the first identifier of the advertising device 120, but also include bearing information of the advertising device 120.

The bearing information of the advertising device 120 is used to indicate a location and an orientation of the advertising device 120. Specifically, the bearing information may include location information (for example, latitude and longitude information) and orientation information of the advertising device 120.

The location information of the advertising device 120 is used to indicate a location of the advertising device 120. For example, the location information may be latitude and longitude of the advertising device 120. The orientation information of the advertising device 120 is used to indicate an orientation of the advertising device 120, for example, an orientation of a display of the advertising device 120.

For example, a vector Z1 shown in FIG. 4 is used to indicate an orientation of the electronic billboard 410, and the vector Z1 is perpendicular to a display of the electronic billboard 410. A point O1 shown in FIG. 4 is used to indicate the location of the advertising device 120.

For another example, a vector Z2 shown in FIG. 5 is used to indicate an orientation of the electronic billboard 510, and the vector Z2 is perpendicular to a display of the electronic billboard 510. A vector Z3 shown in FIG. 5 is used to indicate an orientation of the electronic billboard 520, and the vector Z3 is perpendicular to a display of the electronic billboard 520. A point O2 shown in FIG. 5 is used to indicate a location of the electronic billboard 510, and a point O3 shown in FIG. 5 is used to indicate a location of the electronic billboard 520.

For example, the bearing information (including the location information and the orientation information) of the advertising device 120 may be measured by using instruments (such as a GPS locator and a gyro sensor) when advertisement operation personnel install an electronic billboard. The server 110 may receive the bearing information of the advertising device 120 that is entered by the advertisement operation personnel or a media party, and then send the bearing information of the advertising device 120 to the advertising device 120. Alternatively, the advertisement operation personnel may enter the bearing information to the advertising device 120 through a data interface (for example, a USB interface) on the advertising device 120. The advertising device 120 may store the hearing information entered by the advertisement operation personnel.

It should be noted that, when the wireless signal includes the first identifier of the advertising device 120 and the bearing information of the advertising device 120, the mobile terminal 130 performs S304, and the exposure data of the advertising device 120 that is sent to the server 110 may not only include the first identifier of the advertising device 120, but also include the bearing information of the advertising device 120.

In embodiments, the method in this embodiment of this application may further include: The server 110 monitors, based on the received exposure data, whether the location and the orientation of installing the advertising device 120 meet requirements.

It may be understood that, after detecting the exposure data of the advertising device 120, the server 110 may not only determine that the advertising device 120 has been installed and put into use, but also determine whether the location and the orientation of installing the advertising device 120 (that is, the location and the orientation indicated by the bearing information) meet the requirements. Bearing information of each advertising device 120 may be pre-entered and stored in the server 110 (the hearing information may indicate a location and an orientation of the advertising device 120). If the bearing information of the advertising device 120 that is reported by the mobile terminal 130 is the same as the bearing information of the advertising device 120 that is stored in the server 110, it indicates that the advertising device 120 has been normally installed and put into use.

If the bearing information of the advertising device 120 that is reported by the mobile terminal 130 is different from the bearing information of the advertising device 120 that is stored in the server 110, it indicates that an installation exception occurs in the advertising device 120, that is, the installation of the advertising device 120 does not meet the requirement. In this case, the server 110 may send a prompt indicating that the installation exception occurs in the advertising device 120, so that the advertisement operation personnel can discover and correct the exception in time.

In conclusion, according to the method in this embodiment of this application, the server 110 may not only determine, based on the exposure data reported by the mobile terminal 130, whether the advertising device 120 has been installed and put into use, but also determine whether the location and the orientation of installing the advertising device 120 (that is, the location and the orientation indicated by the bearing information) meet the requirements. That is, the server 110 may determine whether the installation exception occurs in the advertising device 120.

In some embodiments, the advertising device 120 may include one or more displays. For example, the electronic billboard 510 shown in FIG. 5 is installed on a wall in an indoor place, and the electronic billboard 510 includes only one display. For another example, the electronic billboard 410 shown in FIG. 4 is installed in an outdoor place and fastened on the ground. The electronic billboard 410 may include two displays, or may include two displays (for example, front and rear sides of the electronic billboard 410 each include a display). When the front and rear sides of the electronic billboard 410 each include the display, the electronic billboard 410 may broadcast two wireless signals, and the wireless signals include different bearing information, for example, orientations indicated by the bearing information are opposite. In this embodiment of this application, for example, the electronic billboard 410 shown in FIG. 4 includes only one display.

In some embodiments, the wireless signal may include not only the first identifier of the advertising device 120 and the bearing information of the advertising device 120, but also include an identifier of an electronic advertisement being played by the advertising device 120.

An identifier (ID) of an electronic advertisement is used to uniquely identify the electronic advertisement, Different electronic advertisements have different identifiers. For example, an identifier of an electronic advertisement of the brand C children's interest class being played by the electronic billboard 410 shown in FIG. 4 is different from an identifier of an electronic advertisement of the brand A sofa being played by the electronic billboard 510 shown in FIG. 5; the identifier of the electronic advertisement of the brand C children's interest class is different from an identifier of an electronic advertisement of the brand B vehicle being played by the electronic billboard 520 shown in FIG. 5; and the identifier of the electronic advertisement of the brand A sofa is different from the identifier of the electronic advertisement of the brand B vehicle.

It should be noted that, when the wireless signal includes the first identifier of the advertising device 120, the bearing information of the advertising device 120, and the identifier of the electronic advertisement being played by the advertising device 120, the mobile terminal 130 performs S304, and the exposure data of the advertising device 120 that is sent to the server 110 may include: the first identifier of the advertising device 120, the bearing information of the advertising device 120, and the identifier of the electronic advertisement being played by the advertising device 120.

In embodiments, the method in this embodiment of this application may further include: The server 110 monitors, based on the received exposure data, whether the electronic advertisement played by the advertising device 120 is an electronic advertisement delivered by the server 110 to the advertising device 120.

It can be learned from the description in the foregoing embodiment that the server 110 may determine, based on the first identifier and the bearing information that are of the advertising device 120 and that are reported by the mobile terminal 130, whether an installation exception occurs in the advertising device 120. It may be understood that the electronic advertisement played by the advertising device 120 is delivered by the server 110 to the advertising device 120. The server 110 may determine, based on the first identifier of the advertising device 120 and the identifier of the electronic advertisement that are included in the exposure data, whether the electronic advertisement played by the advertising device 120 is an electronic advertisement delivered by the server 110 to the advertising device 120.

In conclusion, according to the method in this embodiment of this application, the server 110 may not only determine, based on the exposure data reported by the mobile terminal 130, whether the advertising device 120 has been normally installed and put into use, but also determine whether the electronic advertisement played by the advertising device 120 is an electronic advertisement delivered by the server 110 to the advertising device 120. That is, the server 110 may further determine, based on the exposure data, whether an exception occurs in the electronic advertisement played by the advertising device 120.

In some embodiments, the exposure data of the advertising device 120 may not only include the first identifier of the advertising device 120, the bearing information of the advertising device 120, and the identifier of the electronic advertisement being played by the advertising device 120, but also include time information. The time information is used to indicate a time at which the mobile terminal 130 detects the wireless signal. The mobile terminal 130 may record the time at which the mobile terminal 130 detects the wireless signal.

In embodiments, the method in this embodiment of this application may further include: The server 110 monitors, based on the received exposure data, whether the advertising device 120 plays, in a time period specified by the server 110, the electronic advertisement delivered by the server 110 to the advertising device 120.

Normally, the advertising device 120 plays the electronic advertisement according to an advertisement play policy indicated by the server 110. The advertisement play policy may indicate a play time period of the electronic advertisement. The server 110 may compare the time indicated by the time information included in the exposure data with the play time period indicated by the advertisement play policy, and may determine whether the advertising device 120 plays the electronic advertisement according to the advertisement play policy indicated by the server 110, for example, whether the advertising device 120 plays a specified electronic advertisement in the time period specified by the server 110.

The server 110 may receive exposure data reported by the plurality of mobile terminals 130 for a same advertising device 120. The server 110 may collect statistics about a first identifier of the advertising device 120, bearing information of the advertising device 120, an identifier of an electronic advertisement, and time information that are included in the exposure data reported by each of the plurality of mobile terminals 130, and compare electronic advertisements played in a same time period (that is, a time period indicated by the time information) and at a same location (that is, a location indicated by the bearing information) in the exposure data reported by the plurality of mobile terminals 130, to detect whether an exception or cheating occurs in the electronic advertisement played by the advertising device 120 (that is, the foregoing same advertising device 120). For example, in the exposure data reported by the plurality of mobile terminals 130, if advertising devices at a same location (that is, the location indicated by the bearing information) play different electronic advertisements in a same time period (that is, the time period indicated by the time information), it indicates that an exception or cheating occurs in the electronic advertisement played by the advertising device 120.

In addition, the server 110 may further collect statistics about exposure traffic of the advertising device 120 in each time period every day based on the exposure data reported by the plurality of mobile terminals 130 for the same advertising device 120. For a method for collecting statistics about the exposure traffic of the advertising device 120 by the server 110, refer to descriptions in the following embodiment. Details are not described in this embodiment. Normally, exposure traffic of an advertising device 120 in a same time period every day fluctuates within a specific range. If exposure traffic of the advertising device 120 in this time period on a specific day fluctuates greatly compared with exposure traffic of the advertising device 120 in this time period in a recent period of time, it indicates that an exception or cheating occurs in the advertising device 120 or an electronic advertisement played by the advertising device 120. In conclusion, in this embodiment of this application, the server 110 may further compare exposure traffic of a same advertising device in a relatively fixed time period every day, to detect whether an exception or cheating occurs in the advertising device or an electronic advertisement played by the advertising device.

In some other embodiments, the wireless signal may not only include data such as the first identifier and the bearing information of the advertising device 120, but also include preset exposure duration, a preset distance range, and a preset included angle range. The preset exposure duration, the preset distance range, and the preset included angle range may be sent by the server 110 to the advertising device 120. The server 110 may receive the preset exposure duration, the preset distance range, and the preset included angle range that are entered by the advertisement operation personnel or a media party, and then send the preset exposure duration, the preset distance range, and the preset included angle range to the advertising device 120. The preset exposure duration, the preset distance range, and the preset included angle range may be used to determine effective exposure of the electronic advertisement played by the advertising device 120. For detailed content of the preset exposure duration, the preset distance range, and the preset included angle range, and determining of the effective exposure, refer to related descriptions in the following embodiment. Details are not described in this embodiment of this application.

In some other embodiments, the exposure data of the advertising device 120 may not only include data such as the first identifier of the advertising device 120, but also include an identifier of the mobile terminal 130. The identifier of the mobile terminal 130 may be a unified identity. The unified identity may be automatically generated by the mobile terminal 130. The unified identity corresponds to the mobile terminal 130, and may be associated with a user who uses the mobile terminal 130, or is used to identify a user who uses the mobile terminal 130. Unified identities associated with different users are different. In this embodiment of this application, the identifier of the mobile terminal 130 is used to determine a specific user holding the mobile terminal 130, that is, determine an audience of the electronic advertisement.

It should be noted that the identifier (for example, the unified identity) of the mobile terminal 130 is associated with the user who uses the mobile terminal 130, that is, the user who uses the mobile terminal 130 may be determined based on the identifier of the mobile terminal 130. Therefore, after receiving the exposure data including the identifier of the mobile terminal 130, the server 110 may determine, based on the identifier of the mobile terminal 130, a specific user who uses the mobile terminal 130, to determine the audience of the electronic advertisement. For a method for collecting, by the server 110, statistics about the audience of the electronic advertisement based on the identifier of the mobile terminal 130 that is included in the exposure data, refer to related descriptions in the following embodiment. Details are not described herein.

In this embodiment, the unified identity is a newly defined identifier, and is an identifier newly added to the conventional technology. The unified identity and an identifier in the conventional technology may exist simultaneously and independently.

It may be understood that the unified identity may be different from the identity in the conventional technology. For example, the unified identity may be represented by using a new character string. For example, the unified identity may include a random number, or include two parts: a prefix and a random number. The random number may be a character string of 256 bits or another length. The prefix may be a character string used to distinguish between different equipment vendors (for example, Huawei or other equipment vendors). Alternatively, although the unified identity is a newly defined identifier, but the unified identity may be an identifier in the conventional technology, that is, the unified identity may be an identifier in the conventional technology. The mobile terminal 130 may use the identifier in the conventional technology as the newly defined unified identity. For example, the mobile terminal 130 is a mobile phone. The unified identity may be an existing device serial number of the mobile phone, for example, an international mobile equipment identity (IMEI). The unified identity and the device serial number of the mobile phone are two types of identifiers that exist simultaneously and independently. For another example, the mobile terminal 130 is a mobile phone. The unified identity may be a media access control (MAC) address of the mobile phone, an integrate circuit card identity (ICCID), or another existing identity. For still another example, the mobile terminal 130 is a mobile phone. The unified identity may be an open advertising ID (OAID) of the mobile phone. Alternatively, the unified identity may be an identifier related to an identifier in the conventional technology. For example, the mobile terminal 130 may generate the unified identity based on the identifier in the conventional technology. For example, the mobile terminal 130 is a mobile phone. The mobile phone may extract some content of an existing identifier such as a device serial number (for example, an IMEI), a MAC address, an ICCID, or an OAID of the mobile phone, and use the extracted content as the unified identity. For still another example, the mobile terminal 130 is a mobile phone. The mobile phone may combine existing identifiers of the mobile phone to generate the unified identity.

In addition, in some embodiments of this application, the unified identity may be an identifier preset when the mobile terminal 130 is delivered from a factory, and the mobile terminal 130 may obtain the unified identity when being powered on for the first time. It may also be understood that the mobile terminal 130 generates the unified identity when being powered on for the first time.

In some other embodiments of this application, the unified identity may be an identifier generated after the mobile terminal 130 is powered on for the first time. For example, the mobile terminal 130 generates the unified identity after determining that the preset condition is met. For example, the mobile terminal 130 is a mobile phone. When determining that the mobile phone establishes a trusted connection to another device for the first time, the mobile phone generates a unified identity, for example, a unified identity 1. Specifically, the mobile phone may generate the unified identity 1 in a process of establishing the trusted connection to the another device, or may generate the unified identity 1 after establishing the trusted connection to the another device.

For example, the mobile phone requests to access a Wi-Fi network provided by a wireless router. After detecting a Wi-Fi password entered by the user, the mobile phone sends the Wi-Fi password to a Wi-Fi router. After verifying that the Wi-Fi password is valid, the Wi-Fi router establishes a Wi-Fi connection to the mobile phone. Because the Wi-Fi connection is a connection established based on a user operation such as an operation of entering a Wi-Fi password by the user, the Wi-Fi connection is a trusted connection authenticated by the user. The mobile phone may generate a unified identity 1 after establishing a trusted connection to the Wi-Fi router, where the unified identity 1 corresponds to the mobile phone, and may be used to identify a user who uses the mobile phone, for example, a user 1.

For another example, the mobile phone requests to establish a Bluetooth connection to a vehicle-mounted device. The user separately performs a Bluetooth pairing operation on the mobile phone and the vehicle-mounted device, and the mobile phone establishes the Bluetooth connection to the vehicle-mounted device. Because the Bluetooth connection is a connection established based on a user operation such as an operation of performing pairing by the user, the Bluetooth connection is a trusted connection authenticated by the user. A mobile phone 1 may generate a unified identity 1 after establishing a trusted connection to the vehicle-mounted device, where the unified identity 1 corresponds to the mobile phone 1, and may be used to identify a user 1 who uses the mobile phone.

In some other embodiments of this application, the mobile terminal 130 generates a unified identity after determining that a same user has used the mobile terminal for a period of time. For example, the mobile terminal 130 is a mobile phone. After a user purchases a mobile phone, the user may not use the mobile phone but give the mobile phone to another user. Therefore, the newly purchased mobile phone may not generate a unified identity temporarily. The mobile phone may determine, based on a preset algorithm model and a use characteristic such as a use habit, a use manner, or a use frequency of the user, that the same user has used the mobile phone for a period of time, and then generate a unified identity used to identify the user. In some other embodiments of this application, the mobile terminal 130 may generate a unified identity according to an indication of a user. For example, the mobile terminal 130 is a mobile phone. The user may trigger a corresponding option on a setting menu of the mobile phone, to indicate the mobile phone to generate a unified identity.

It may be understood that, the mobile terminal 130 listens to the wireless signal, and may detect wireless signals that are broadcast by a plurality of advertising devices. However, some advertising devices may not be delivered by the server 110. Therefore, the mobile terminal 130 does not need to report exposure events of these advertising devices to the server 110. In this case, the server 110 may periodically indicate device information of a plurality of to-be-monitored advertising devices to the mobile terminal 130, so that the mobile terminal 130 can identify a to-be-monitored advertising device based on the device information. Then, the mobile terminal 130 may report exposure data of the to-be-monitored advertising device to the server 110, but does not report exposure data of a non-to-be-monitored advertising device (for example, an advertising device other than the to-be-monitored advertising device) to the server 110.

Figure 6:
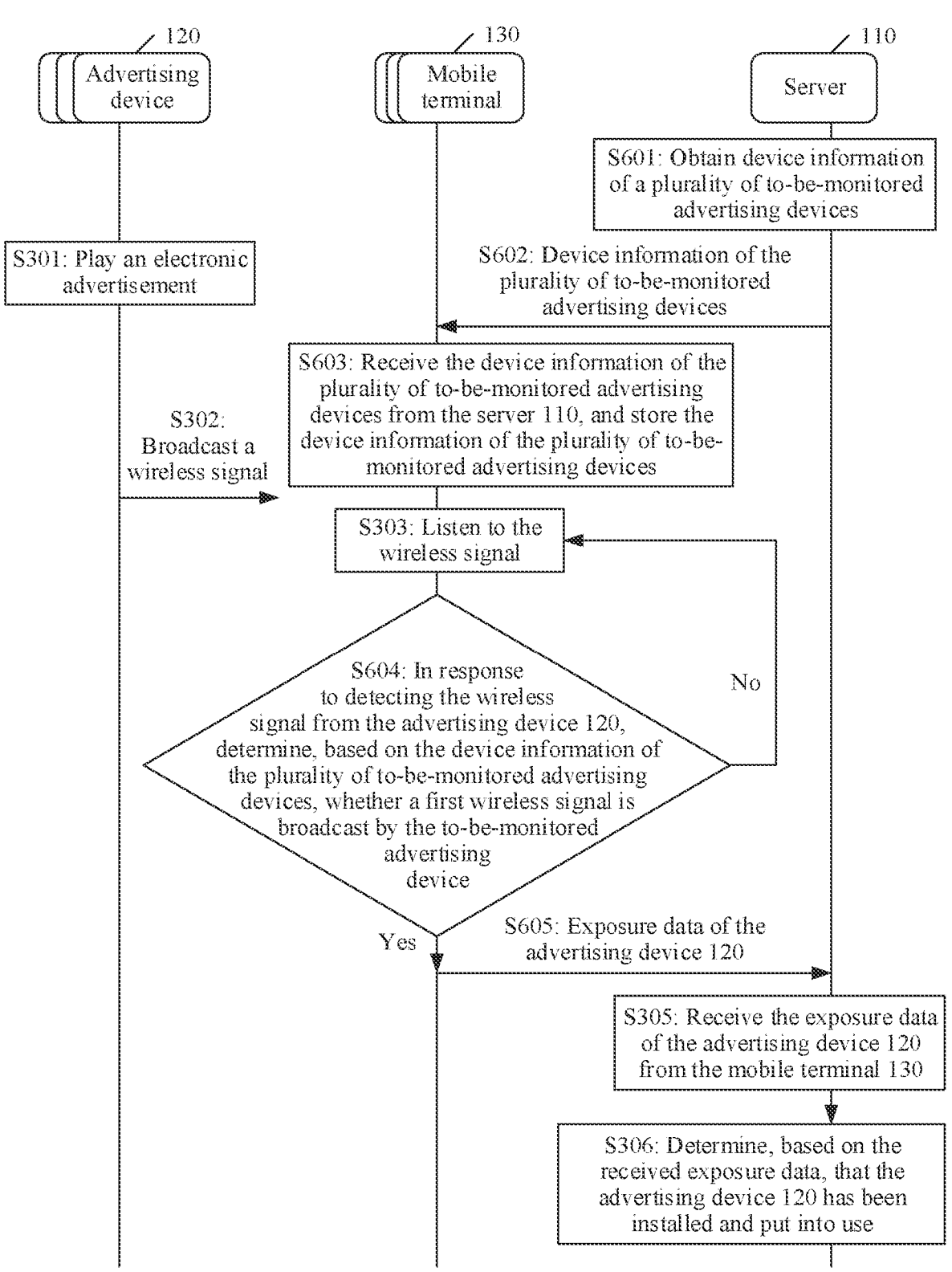
FIG. 6 is a flowchart of an advertising device monitoring method according to an embodiment of this application.

Specifically, the method in this embodiment of this application may further include S601 to S603. For example, as shown in FIG. 6, before S303 shown in FIG. 3, the method in this embodiment of this application may further include S601 to S603.

S601: The server 110 obtains device information of a plurality of to-be-monitored advertising devices.

For example, the server 110 may periodically obtain the device information of the plurality of to-be-monitored advertising devices, and send the device information of the plurality of to-be-monitored advertising devices to the mobile terminal 130. For example, a period in which the server 110 obtains the device information of the plurality of to-be-monitored advertising devices may be the foregoing preset period.

S602: The server 110 sends the device information of the plurality of to-be-monitored advertising devices to the mobile terminal 130.

For data included in the device information of the to-be-monitored adverting device, refer to related descriptions in the following embodiment. Details are not described in this embodiment of this application.

S603: The mobile terminal 130 receives the device information of the plurality of to-be-monitored advertising devices from the server 110, and stores the device information of the plurality of to-be-monitored advertising devices.

It may be understood that the advertising device 120 may be a to-be-monitored advertising device. Certainly, the advertising device 120 may not be a to-be-monitored advertising device. To prevent the mobile terminal 130 from reporting exposure data of a non-to-be-monitored advertising device to the server 110, the mobile terminal 130 may perform S604 after detecting the wireless signal that is broadcast by the advertising device 120 (that is, performing S303) and before reporting the exposure event to the server 110 (that is, performing S304). Specifically, after S303, the method in this embodiment of this application may further include S604 and S605. For example, as shown in FIG. 6, S304 shown in FIG. 3 may be replaced with S604 and S605.

S604: In response to detecting the wireless signal from the advertising device 120, the mobile terminal 130 determines, based on the device information of the plurality of to-be-monitored advertising devices, whether the wireless signal is broadcast by the to-be-monitored advertising device.

For a method in which the mobile terminal 130 determines, based on the device information of the plurality of to-be-monitored advertising devices, whether the wireless signal from the advertising device 120 is broadcast by the to-be-monitored advertising device, refer to related descriptions in the following embodiment. Details are not described in this embodiment of this application.

Specifically, if the wireless signal from the advertising device 120 is broadcast by the to-be-monitored advertising device, the mobile terminal 130 may perform S605. If the wireless signal detected by the mobile terminal 130 is not broadcast by the to-be-monitored advertising device, the mobile terminal 130 does not send exposure data of the advertising device 120 to the server 110, and the mobile terminal 130 may perform S303.

S605: The mobile terminal 130 sends exposure data of the advertising device 120 to the server 110.

In this embodiment of this application, the mobile terminal 130 detects and reports an exposure event only for the to-be-monitored advertising device indicated by the server 110. In this way, not only power consumption of the mobile terminal 130 can be reduced, but also the exposure event of the to-be-monitored advertising device indicated by the server 110 can be reported to the server 110 in a targeted manner.

In some embodiments, the device information of the to-be-monitored advertising device may include a first identifier of the to-be-monitored advertising device. For detailed descriptions of the first identifier of the to-be-monitored advertising device, refer to descriptions of the first identifier of the advertising device 120 in the foregoing embodiment. Details are not described again in this embodiment.

In this embodiment, the wireless signal includes the first identifier of the advertising device 120, and the device information of the to-be-monitored advertising device that is stored in the mobile terminal 130 includes the first identifier of the to-be-monitored advertising device. Therefore, in S604, the mobile terminal 130 may compare the first identifier of the advertising device 120 that is carried in the wireless signal with the first identifier of the to-be-monitored advertising device. If the first identifier of the advertising device 120 is the same as a first identifier of any to-be-monitored advertising device, it indicates that the advertising device 120 is a to-be-monitored advertising device, and the wireless signal is broadcast by the to-be-monitored advertising device. If the first identifier of the advertising device 120 is different from first identifiers of all to-be-monitored advertising devices, it indicates that the advertising device 120 is not a to-be-monitored advertising device, and the wireless signal is not broadcast by the to-be-monitored advertising device.

In some embodiments, the device information of the to-be-monitored advertising device may include a second identifier of the to-be-monitored advertising device.

In a first case, the second identifier of the to-be-monitored advertising device may be a wireless network identifier of the advertising device. The wireless signal that is broadcast by a wireless device (for example, the advertising device) carries a wireless network identifier of the wireless device. Different wireless devices have different wireless network identifiers. For example, the wireless network identifier may be a MAC address of the advertising device. For example, the MAC address of the advertising device may be 08:00:20:0A:8C:6D.

In a second case, the second identifier of the to-be-monitored advertising device may be prefix information of a wireless network identifier of the to-be-monitored advertising device. The prefix information of the wireless network identifier may be the first N characters of the wireless network identifier. Herein, N≥2, and N is a positive integer. Prefix information (that is, the first N characters) of wireless network identifiers of a plurality of advertising devices generated by a same manufacturer is the same. For example, the wireless network identifier is a MAC address, and N=6. Assuming that a wireless network identifier of the electronic billboard 410 shown in FIG. 4 is 08:00:20:0A:8C:6D, a second identifier of the electronic billboard 410 is 08:00:20.

To be specific, the second identifier (that is, the prefix information of the wireless network identifier) of the to-be-monitored advertising device may be used to indicate a plurality of devices whose prefix information of wireless network identifiers is the second identifier. To be specific, the second identifier of the to-be-monitored advertising device may indicate a plurality of advertising devices whose prefix information of wireless network identifiers is the second identifier (that is, a device number of a section corresponding to the second identifier). In this way, the server 110 may indicate the second identifier of the to-be-monitored advertising device to the mobile terminal 130, to indicate the mobile terminal 130 to monitor the plurality of advertising devices whose prefix information of the wireless network identifiers is the second identifier.

It may be understood that the wireless signal that is broadcast by a wireless device (for example, the advertising device 120) carries a wireless network identifier of the wireless device. Different wireless devices have different wireless network identifiers. To be specific, the wireless signal that is broadcast by the advertising device 120 further includes a second identifier of the advertising device 120. For example, when the wireless signal is a Bluetooth beacon frame or a Wi-Fi beacon frame, the wireless network identifier may be a beacon identifier (that is, a beacon ID) of the advertising device 120. It should be noted that, for detailed descriptions of the second identifier of the advertising device 120, refer to descriptions of the second identifier of the to-be-monitored advertising device in the foregoing embodiment. Details are not described again in this embodiment.

In this embodiment, the wireless signal includes the second identifier of the advertising device 120, and the device information of the to-be-monitored advertising device that is stored in the mobile terminal 130 includes the second identifier of the to-be-monitored advertising device. Therefore, in S604, the mobile terminal 130 may compare the second identifier of the advertising device 120 that is carried in the wireless signal with the second identifier of the to-be-monitored advertising device. If the second identifier of the advertising device 120 is the same as a second identifier of any to-be-monitored advertising device, it indicates that the advertising device 120 is a to-be-monitored advertising device, and the wireless signal is broadcast by the to-be-monitored advertising device. If the second identifier of the advertising device 120 is different from second identifiers of all to-be-monitored advertising devices, it indicates that the advertising device 120 is not a to-be-monitored advertising device, and the wireless signal is not broadcast by the to-be-monitored advertising device.

In some other embodiments, the device information of the to-be-monitored advertising device may include a first identifier and a second identifier of the to-be-monitored advertising device.

In this embodiment, the mobile terminal 130 performs S604, may compare the second identifier of the advertising device 120 that is carried in the wireless signal with the second identifier of the to-be-monitored advertising device, and compare the first identifier of the advertising device 120 that is carried in the wireless signal with the first identifier of the to-be-monitored advertising device. If the second identifier of the advertising device 120 is the same as a second identifier of any to-be-monitored advertising device, and the first identifier of the advertising device 120 is the same as a first identifier of the to-be-monitored advertising device, it indicates that the advertising device 120 is a to-be-monitored advertising device, and the wireless signal is broadcast by the to-be-monitored advertising device.

In some embodiments, the server 110 may serve as an advertising platform to receive the first identifier, the second identifier, and the bearing information of the advertising device that are entered by a media party on the advertising platform.

in this embodiment, a method in which the server 110 serves as the advertising platform to receive an advertisement slot (that is, an advertising device) registered by the media party, and a method in which the server 110 serves as the advertising platform to receive data such as a first identifier, a second identifier, and bearing information of the registered advertisement slot (that is, the advertising device, such as a to-be-monitored advertising device) entered by the media party are described.

It can be learned from the foregoing embodiment that the server 110 may provide the advertising platform, and the advertising platform provides an advertisement slot (that is, an advertising device) registration service for the media party. The advertising platform provided by the server 110 for the media party may be referred to as a supplied side platform (SSP). The media party may register an advertisement slot on the advertising platform by using the first electronic device 140 shown in FIG. 1B. After the media party registers the advertisement slot on the advertising platform by using the first electronic device 140, if the server 110 delivers an advertisement to the advertisement slot, the media party can obtain benefits. In a process of registering the advertisement slot (that is, the advertising device) on the advertising platform provided by the server 110, the media party can enter data such as a first identifier, a second identifier, and bearing information of the registered advertising device (for example, a to-be-monitored advertising device) on the advertising platform.

For example, the first electronic device 140 may log in to the advertising platform provided by the server 110, and display a home page of the advertising platform. The home page of the advertising platform may be a web page, or may be a home page of the first app. The server 110 serves as a server of the web page or the first app of the advertising platform. The home page of the advertising platform may provide an advertisement slot registration service and a registered advertisement slot management service for the media party.

Figure 7A:
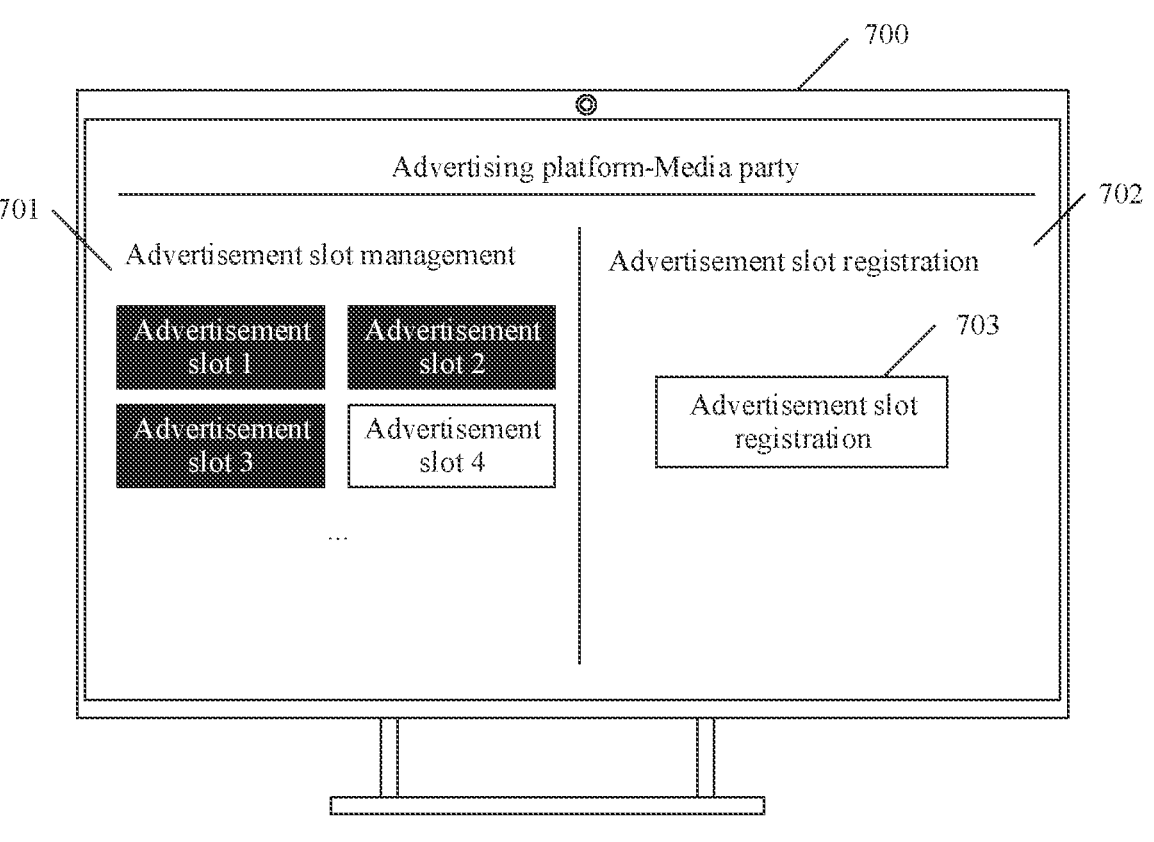
FIG. 7A is a schematic diagram of a terminal display interface of a media party according to an embodiment of this application.

For example, the first electronic device 140 is a PC 700 shown in FIG. 7A. The PC 700 may display a home page of an advertising platform. The home page of the advertising platform may include an advertisement slot registration area 702 and an advertisement slot management area 701.

The advertisement slot registration area 702 includes an "advertisement slot registration" option 703. The PC 700 may display, in response to a click operation performed by a user on the "advertisement slot registration" option 703, an advertisement slot registration interface 704 shown in FIG. 7B. The advertisement slot registration interface 704 includes a first identifier entry box 705, a second identifier entry box 706, a location entry box 707, and an orientation entry box 708. The first identifier entry box 705 is used to enter a first identifier of an advertising device. The second identifier entry box 706 is used to enter a second identifier of the advertising device. The location entry box 707 is used to enter location information (for example, latitude and longitude) of the advertising device. The orientation entry box 708 is used to enter orientation information of the advertising device.

Certainly, as the advertising platform, the server 110 may further receive preset exposure duration, a preset distance range, and a preset included angle range that are entered by a media party on the advertising platform. For example, the advertisement slot registration interface 704 may further include other entry boxes, for example, entry boxes of data such as the preset distance range, the preset exposure duration, and the preset included angle range, which are not shown in the accompanying drawing.

Figure 7B:
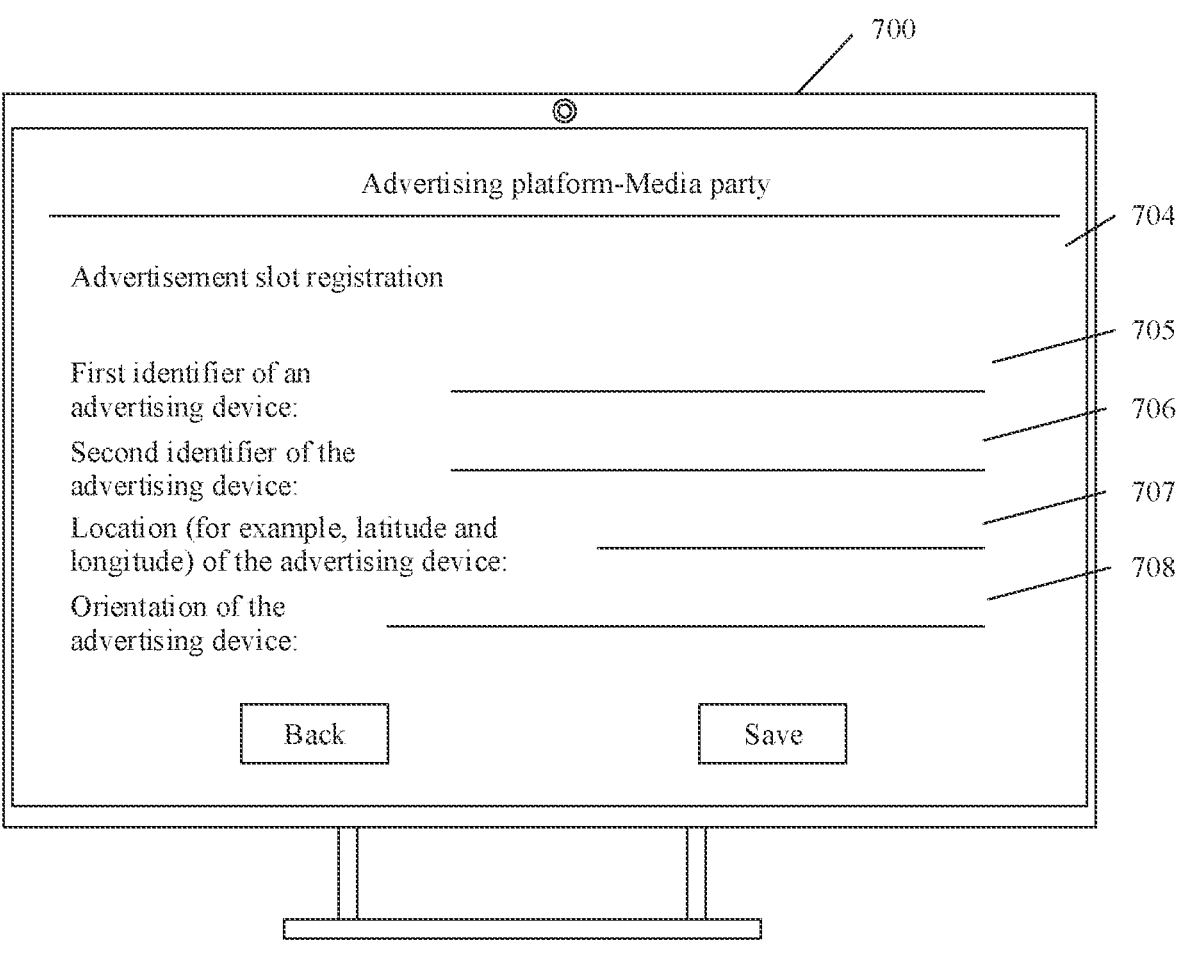
FIG. 7B is a schematic diagram of a terminal display interface of another media party according to an embodiment of this application.

The advertisement slot registration interface 704 shown in FIG. 7B further includes a "Back" button and a "Save" button. The PC 700 may display the home page of the advertising platform in response to a click operation (for example, a single-click operation) performed by the user on the "Back" button. The PC 700 may send, to the server 110 in response to a click operation (for example, a single-click operation) performed by the user on the "Save" button, the device information of the advertising device that is entered by the media party in the advertisement slot registration interface 704. In this way, the server 110 can receive the device information of the advertising device.

The advertisement slot management area 701 shown in FIG. 7A includes a plurality of advertisement slot options, for example, an "advertisement slot 1" option, an "advertisement slot 2" option, an "advertisement slot 3" option, and an "advertisement slot 4" option. Each advertisement slot option corresponds to one advertising device that has registered with the server 110, and the advertising device that has registered with the server may be used for delivery of an electronic advertisement. For example, the "advertisement slot 1" option, the "advertisement slot 2" option, and the "advertisement slot 3" option each correspond to an advertising device to which an electronic advertisement has been delivered, and the "advertisement slot 4" option corresponds to an advertising device to which no electronic advertisement has been delivered. In response to a click operation (for example, a single-click operation) performed by the media party on an advertisement slot option, the PC 700 may query device information of a corresponding advertising device from the server 110, and display the found device information. If an electronic advertisement has been delivered on the advertising device, the PC 700 may further query related information of the electronic advertisement delivered on the advertising device from the server 110 and display the related information, which is not shown in the accompanying drawing.

It should be noted that, in this embodiment of this application, the page or the interface of the advertising platform provided by the server 110 includes but is not limited to the page or the interface shown in FIG. 7A and FIG. 7B. A specific form of the page or the interface of the advertising platform provided by the server 110 is not limited in this embodiment of this application.

In some other embodiments, the mobile terminal 130 may detect a plurality of same wireless signals that are broadcast by the advertising device 120. In this case, the mobile terminal 130 may perform S304 shown in FIG. 3 or S604 and S605 shown in FIG. 6 for the plurality of same wireless signals that are detected. Consequently, power consumption of the mobile terminal 130 is increased. In addition, for the plurality of same wireless signals, the mobile terminal 130 reports an exposure event to the server 110 for a plurality of times. Consequently, a same mobile terminal reports a plurality of pieces of same exposure data to the server 110, and the exposure data has high repeatability, which may affect accuracy of advertisement effect analysis.

To resolve the foregoing problem, the mobile terminal 130 may perform repeated detection on the detected wireless signal. Specifically, after the mobile terminal 130 detects a wireless signal, if the mobile terminal 130 detects the wireless signal again within preset duration, the mobile terminal 130 does not perform S604 shown in FIG. 6 or S304 shown in FIG. 3, and the mobile terminal 130 may discard the wireless signal.

Specifically, after S303, the method in this embodiment of this application may further include the following step: After detecting a wireless signal (for example, a wireless signal 1), the mobile terminal 130 stores the wireless signal 1. After detecting a next wireless signal (for example, a wireless signal 2), the mobile terminal 130 may determine whether the wireless signal 2 is the same as the wireless signal 1 stored in the mobile terminal 130. If the wireless signal 2 is different from any wireless signal stored in the mobile terminal 130, the mobile terminal 130 may perform S604 shown in FIG. 6 or S304 shown in FIG. 3. If the wireless signal 2 is the same as any wireless signal (for example, the wireless signal 1) stored in the mobile terminal 130, the mobile terminal 130 does not perform S604 shown in FIG. 6 or S304 shown in FIG. 3, and the mobile terminal 130 may discard the wireless signal 2. The mobile terminal 130 may delete the wireless signal 1 after the preset duration. For example, the preset duration may be a current day or n hours (h) starting from a time at which the mobile terminal 130 detects a wireless signal. For example, n may be any value such as 1, 2, 3, 6, or 10.

It should be noted that, in this embodiment of this application, that the wireless signal 1 is the same as the wireless signal 2 may include: A wireless network identifier carried in the wireless signal 1 is the same as a wireless network identifier carried in the wireless signal 2. Alternatively, a wireless network identifier carried in the wireless signal 1 is the same as a wireless network identifier carried in the wireless signal 2, and related data of the advertising device that is included in the wireless signal 1 is the same as related data of the advertising device that is included in the wireless signal 2.

For detailed descriptions of the related data of the advertising device that is included in the wireless signal, refer to descriptions in the foregoing embodiment. Details are not described again in this embodiment of this application.

In this embodiment of this application, the mobile terminal 130 may perform repeated detection on the detected wireless signal. In this way, power consumption of the mobile terminal 130 can be reduced. In addition, a same mobile terminal 130 can be prevented from reporting a plurality of pieces of same exposure data to the server 110, and accuracy of advertisement effect analysis can be improved.

In some embodiments, the exposure event reported by the mobile terminal 130 to the server 110 may be an effective exposure event. To be specific, after detecting the wireless signal that is broadcast by the advertising device 120, the mobile terminal 130 may not immediately report the exposure event of the advertising device 120 to the server 110, but reports the effective exposure event of the advertising device 120 to the server 110 after determining that the electronic advertisement played by the advertising device 120 generates effective exposure to the user (for example, the user 1) holding the mobile terminal.

In this embodiment, the wireless signal includes the first identifier and the bearing information of the advertising device 120, and preset exposure duration, a preset distance range, and a preset included angle range.

Alternatively, the wireless signal includes the first identifier and the bearing information of the advertising device 120, and may not include preset exposure duration, a preset distance range, or a preset included angle range. The preset exposure duration, the preset distance range, and the preset included angle range may be prestored in the mobile terminal 130. For example, the device information of the to-be-monitored advertising device may include: a first identifier of the to-be-monitored advertising device, preset exposure duration, a preset distance range, and a preset included angle range. After receiving the device information of the to-be-monitored advertising device from the server 110, the mobile terminal 130 may store the device information of the to-be-monitored advertising device.

The method in this embodiment of this application may further include: In response to detecting the wireless signal from the advertising device 120, the mobile terminal 130 may collect real-time location information of the mobile terminal 130. The real-time location information is used to determine a location and a movement direction of the mobile terminal 130. The mobile terminal 130 may collect statistics about first exposure duration of the advertising device 120 for the mobile terminal 130. The first exposure duration is duration in which a bearing of the mobile terminal 130 relative to the advertising device 120 meets a preset condition. The mobile terminal 130 may determine whether the first exposure duration is greater than a preset exposure threshold. If the first exposure duration is greater than the preset exposure threshold, the mobile terminal 130 may report an effective exposure event of the advertising device 120 to the server 110, and the effective exposure event carries the exposure data of the advertising device 120. Optionally, the exposure data of the advertising device 120 may further include the first exposure duration.

For example, the preset exposure duration may be 5 to 10 seconds (s). The preset distance range is a determining threshold of the distance between the advertising device 120 and the mobile terminal 130, and is compared with the distance between the advertising device 120 and the mobile terminal 130, to determine whether the electronic advertisement played by the advertising device 120 generates effective exposure to the user 1. For example, as shown in FIG. 4, a point O1 is a location of the electronic billboard 410. FIG. 4 shows two circles (circles shown by dashed lines) with a circle center O1, a radius R1, and a radius R2. The preset distance range is R2 to R1 shown in FIG. 4. If a distance between the user 1 and the advertising device 120 is within the preset distance range (R2 to R1 shown in FIG. 4), the user 1 can clearly and completely watch the electronic advertisement played by the advertising device 120.

It should be noted that, when the preset distance range is determined, the investigated user is a user whose vision or corrected vision is normal vision (for example, 1.0). For example, the preset distance range may be 20 meters (m) to 100 m. As shown in FIG. 4, R1=20 m, and R2=100 m. In this embodiment of this application, that the user can clearly and completely watch the electronic advertisement played by the advertising device 120 specifically means that the user can watch the electronic advertisement played by the advertising device 120, and learn, through watching, of general content to be propagated by the electronic advertisement.

Certainly, for determining the preset distance range, further refer to a maximum transmission distance of the wireless signal. For example, the maximum transmission distance of the wireless signal may be greater than a maximum value of the preset distance range. Alternatively, a difference between the maximum transmission distance of the wireless signal and the maximum value of the preset distance range is less than a preset value (for example, 10 m, 5 m, or 3 m).

Figure 8:
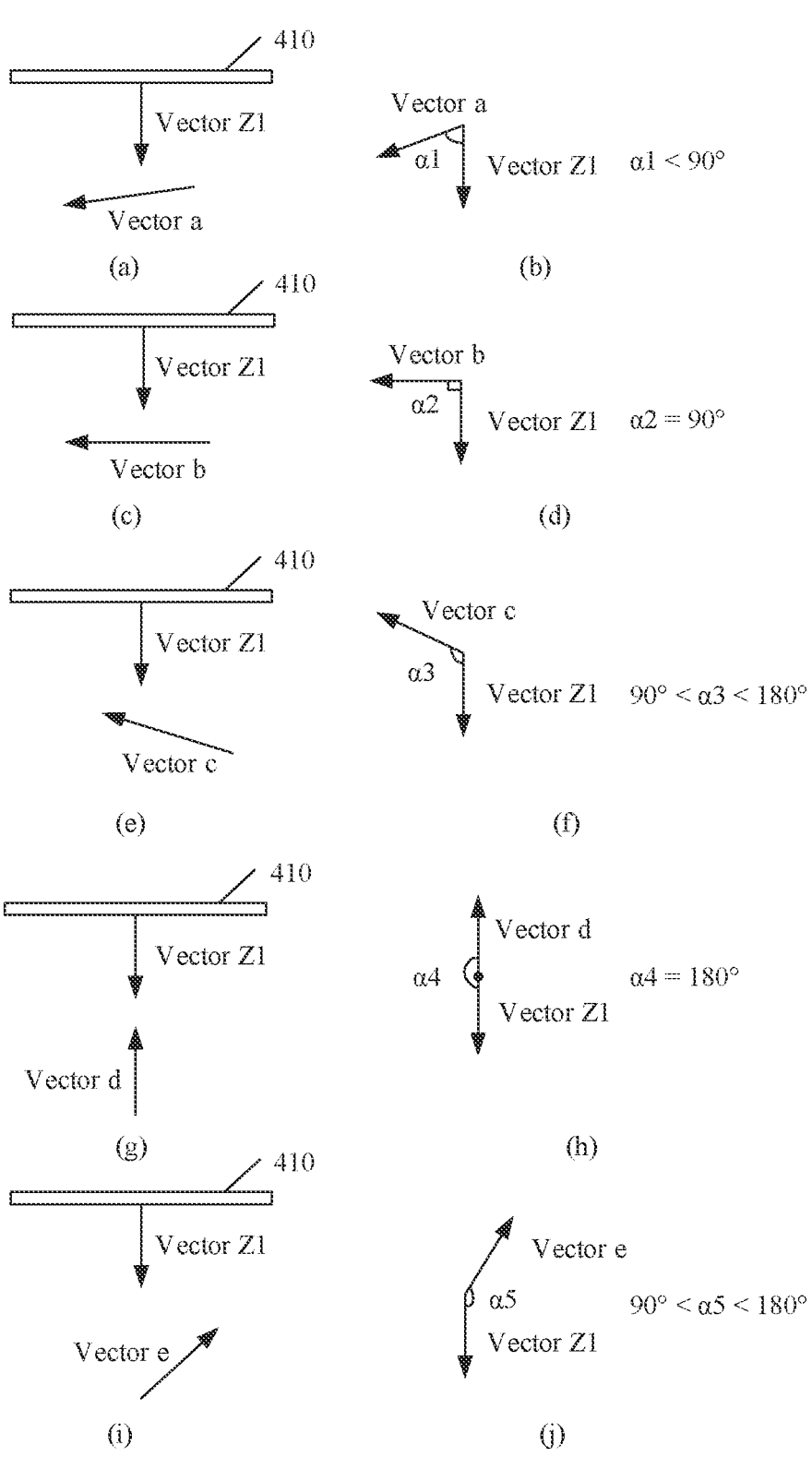
FIG. 8 is a top view of an advertising device in the scenario shown in FIG. 4, and a schematic diagram of an included angle between an orientation of the advertising device and a movement direction of a mobile terminal in the scenario shown in FIG. 4.

For example, the advertising device 120 is the electronic billboard 410 shown in FIG. 4, (a) in FIG. 8, (c) in FIG. 8, (e) in FIG. 8, (g) in FIG. 8, and (i) in FIG. 8 each are a top view of the electronic billboard 410, and a schematic diagram of an included angle between an orientation of the electronic billboard 410 and a movement direction of the mobile terminal 130. A vector Z1 is used to indicate an orientation of the electronic billboard 410.

When the movement direction of the mobile terminal 130 is a direction shown by a vector a shown in (a) in FIG. 8, the included angle between the movement direction of the mobile terminal 130 and the orientation of the electronic billboard 410 is $\alpha1$ shown in (b) in FIG. 8, that is, an included angle between the vector a and the vector Z1. Herein, $\alpha1<90°$. Usually, when the movement direction of the mobile terminal 130 is the direction shown by the vector a shown in (a) in FIG. 8, an orientation of the face of the user (that is, the user 1) holding the mobile terminal 130 is also the direction shown by the vector a. In this case, the user 1 cannot clearly and completely watch the electronic advertisement played by the electronic billboard 410. Therefore, when the included angle between the movement direction of the mobile terminal 130 and the orientation of the electronic billboard 410 is less than 90°, the electronic advertisement played by the electronic billboard 410 does not generate effective exposure to the user 1.

When the movement direction of the mobile terminal 130 is a direction shown by a vector b shown in (c) in FIG. 8, the included angle between the movement direction of the mobile terminal 130 and the orientation of the electronic billboard 410 is $\alpha2$ shown in (d) in FIG. 8, that is, an included angle between the vector b and the vector Z1. Herein, $\alpha2=90°$. Usually, when the movement direction of the mobile terminal 130 is the direction shown by the vector b shown in (c) in FIG. 8, an orientation of the face of the user 1 is also the direction shown by the vector b. In this case, the user 1 cannot clearly and completely watch the electronic advertisement played by the electronic billboard 410. Therefore, when the included angle between the movement direction of the mobile terminal 130 and the orientation of the electronic billboard 410 is equal to 90°, the electronic advertisement played by the electronic billboard 410 does not generate effective exposure to the user 1.

When the movement direction of the mobile terminal 130 is a direction shown by a vector c shown in (e) in FIG. 8, the included angle between the movement direction of the mobile terminal 130 and the orientation of the electronic billboard 410 is $\alpha3$ shown in (f) in FIG. 8, that is, an included angle between the vector c and the vector Z1. Herein, $90°<\alpha3<180°$. Usually, when the movement direction of the mobile terminal 130 is the direction shown by the vector c shown in (e) in FIG. 8, an orientation of the face of the user 1 is also the direction shown by the vector c. In this case, the user 1 can clearly and completely watch the electronic advertisement played by the electronic billboard 410. Therefore, when the included angle between the movement direction of the mobile terminal 130 and the orientation of the electronic billboard 410 is greater than 90° and less than 180°, the electronic advertisement played by the electronic billboard 410 can generate effective exposure to the user 1.

When the movement direction of the mobile terminal 130 is a direction shown by a vector d shown in (g) in FIG. 8, the included angle between the movement direction of the mobile terminal 130 and the orientation of the electronic billboard 410 is $\alpha4$ shown in (h) in FIG. 8, that is, an included angle between the vector d and the vector Z1. Herein, $\alpha4=180°$. Usually, when the movement direction of the mobile terminal 130 is the direction shown by the vector d shown in (g) in FIG. 8, an orientation of the face of the user

1 is also the direction shown by the vector d. In this case, the user 1 can clearly and completely watch the electronic advertisement played by the electronic billboard 410. Therefore, when the included angle between the movement direction of the mobile terminal 130 and the orientation of the electronic billboard 410 is equal to 180°, the electronic advertisement played by the electronic billboard 410 can generate effective exposure to the user 1.

When the movement direction of the mobile terminal 130 is a direction shown by a vector e shown in (i) in FIG. 8, the included angle between the movement direction of the mobile terminal 130 and the orientation of the electronic billboard 410 is $\alpha5$ shown in (j) in FIG. 8, that is, an included angle between the vector e and the vector Z1. Herein, $90°<\alpha5<180°$. Usually, when the movement direction of the mobile terminal 130 is the direction shown by the vector e shown in (i) in FIG. 8, an orientation of the face of the user 1 is also the direction shown by the vector e. In this case, the user 1 can clearly and completely watch the electronic advertisement played by the electronic billboard 410. Therefore, when the included angle between the movement direction of the mobile terminal 130 and the orientation of the electronic billboard 410 is greater than 90° and less than 180°, the electronic advertisement played by the electronic billboard 410 can generate effective exposure to the user 1.

In conclusion, when the included angle between the movement direction of the mobile terminal 130 and the orientation of the electronic billboard 410 is greater than 90° and less than or equal to 180°, the electronic advertisement played by the electronic billboard 410 can generate effective exposure to the user 1. For example, the preset included angle range may be [M1, M2], where $90°<M1<180°$, and $M1<M2\leq180°$. For example, $M1=100°$, and $M2=180°$, and the preset included angle range is [100°, 180°]. For another example, $M1=110°$, $M2=180°$, and the preset included angle range is [110°, 180°].

That the bearing of the mobile terminal 130 relative to the advertising device 120 meets the preset condition may be specifically as follows: A distance between the mobile terminal 130 and the advertising device 120 is within a preset distance range, the mobile terminal 130 is located on one side of the orientation of the advertising device 120, and an included angle between the movement direction of the mobile terminal 130 and the orientation of the advertising device 120 is within a preset included angle range.

It may be understood that, if the bearing of the mobile terminal 130 relative to the advertising device 120 meets the preset condition, it indicates that a user holding the mobile terminal 130 may pay attention to the mobile terminal 130, that is, the advertising device 120 may generate effective exposure to the user holding the mobile terminal 130. If the bearing of the mobile terminal 130 relative to the advertising device 120 does not meet the preset condition, it indicates that a user holding the mobile terminal 130 does not pay attention to the advertising device 120, that is, the advertising device 120 does not generate effective exposure to the user holding the mobile terminal 130.

The server 110 may receive effective exposure events reported by a plurality of mobile terminals 130. The effective exposure event carries exposure data. When the exposure data includes the first identifier of the advertising device 120 and the identifier of the mobile terminal 130, the server 110 may analyze the exposure data carried in the effective exposure event, to determine exposure traffic and an audience of each advertising device 120.

For example, for each advertising device 120, the server 110 may collect statistics about a quantity of effective exposure events of the advertising device 120 in a specific time period (for example, a week, a day, a month, or a time period in a day). Exposure data in an effective exposure event of an advertising device 120 includes an identifier of the advertising device 120. Then, the server 110 may determine the quantity of effective exposure events of the advertising device 120 in the specific time period as exposure traffic of the advertising device 120 in the specific time period.

In addition, the server 110 may collect statistics about the identifier of the mobile terminal in the effective exposure event of the advertising device 120 in the specific time period. It may be understood that different mobile terminals may be associated with or correspond to different users (that is, audiences). The server 110 may store an association relationship between the identifier of the mobile terminal and the user. Therefore, the server 110 may determine, based on the identifier of the mobile terminal in the effective exposure event, an audience that is of the electronic advertisement played by the advertising device 120 and that is in the specific time period, that is, may determine which users watch the electronic advertisement played by the advertising device 120.

It may be understood that one advertising device 120 may play a plurality of electronic advertisements. For example, the advertising device 120 may play different electronic advertisements in different time periods. The wireless signal may further include an identifier of the electronic advertisement being played by the advertising device 120. Correspondingly, the exposure data may further include the identifier of the electronic advertisement. In this case, the server 110 may further determine, based on the effective exposure events reported by the plurality of mobile terminals 130, the exposure traffic and the audience of each electronic advertisement played by the advertising device 120.

For example, the server 110 may collect statistics about a quantity of effective exposure events of each electronic advertisement in a specific time period (for example, a week, a day, a month, or a time period in a day). The electronic advertisement may be played on a plurality of advertising devices. Therefore, an effective exposure event of one electronic advertisement may be triggered because the plurality of advertising devices generate effective exposure to the mobile terminal when playing the electronic advertisement. Exposure data in the effective exposure event of the electronic advertisement includes an identifier of the electronic advertisement. Then, for each electronic advertisement, the server 110 may determine the quantity of effective exposure events of the electronic advertisement in the specific time period as exposure traffic of the electronic advertisement in the specific time period.

In addition, the server 110 may collect statistics about the identifier of the mobile terminal in the effective exposure event of the electronic advertisement in the specific time period. It may be understood that different mobile terminals correspond to different audiences. The server 110 may store a correspondence between the identifier of the mobile terminal and the user (that is, the audience). Therefore, the server 110 may determine an audience (that is, a group of people) of the electronic advertisement in the specific time period based on the identifier of the mobile terminal in the effective exposure event, that is, may determine which users watch the electronic advertisement.

The server 110 may optimize a delivery policy of the advertising device 120 and a delivery policy of the electronic advertisement based on the exposure traffic and the audience of the electronic advertisement played by each advertising device 120. The delivery policy of the advertising device 120 may indicate a delivery (that is, installation) location of the advertising device 120, a quantity of advertising devices 120 to be delivered that is, installed) in each region (or area), a size of the advertising device 120, a type of the advertising device 120, and the like. The delivery policy of the electronic advertisement may indicate an advertising device 120 to which the electronic advertisement is to be delivered, a play time period of the electronic advertisement, a quantity of play times of the electronic advertisement, and the like.

In this embodiment of this application, the server 110 may analyze the exposure data carried in the foregoing effective exposure event, to obtain an installation status of each advertising device 120 and a delivery status of the electronic advertisement. For a method for analyzing, by the server 110, the exposure data carried in the effective exposure event, and determining the installation status of the advertising device 120 and the delivery status of the electronic advertisement, refer to related descriptions in the foregoing embodiment. Details are not described in this embodiment of this application. Then, the server 110 may detect, based on the installation status of each advertising device 120 and the delivery status of the electronic advertisement, whether an installation exception occurs in each advertising device 120, and detect whether each advertising device 120 plays a specified electronic advertisement in a specified time period according to an advertisement play policy indicated by the server 110, to provide an advertisement delivery service for a brand advertiser.

As an advertising platform, the server 110 may provide the advertisement delivery service for the brand advertiser. For example, the server 110 may provide, based on the received exposure data, a query service for the brand advertiser based on the delivery status of the electronic advertisement. The brand advertiser may deliver an electronic advertisement on the advertising platform by using the second electronic device 150 shown in FIG. 1B. In addition, the brand advertiser may experience the advertisement delivery service on the advertising platform by using the second electronic device shown in FIG. 1B.

For example, the second electronic device 150 may log in to the advertising platform provided by the server 110, and display a home page of the advertising platform. The home page of the advertising platform may be a web page, or may be a home page of the second app. The server 110 serves as a server of the web page or the second app of the advertising platform. The home page of the advertising platform may provide an advertisement delivery service for a brand advertiser.

Figure 9A:
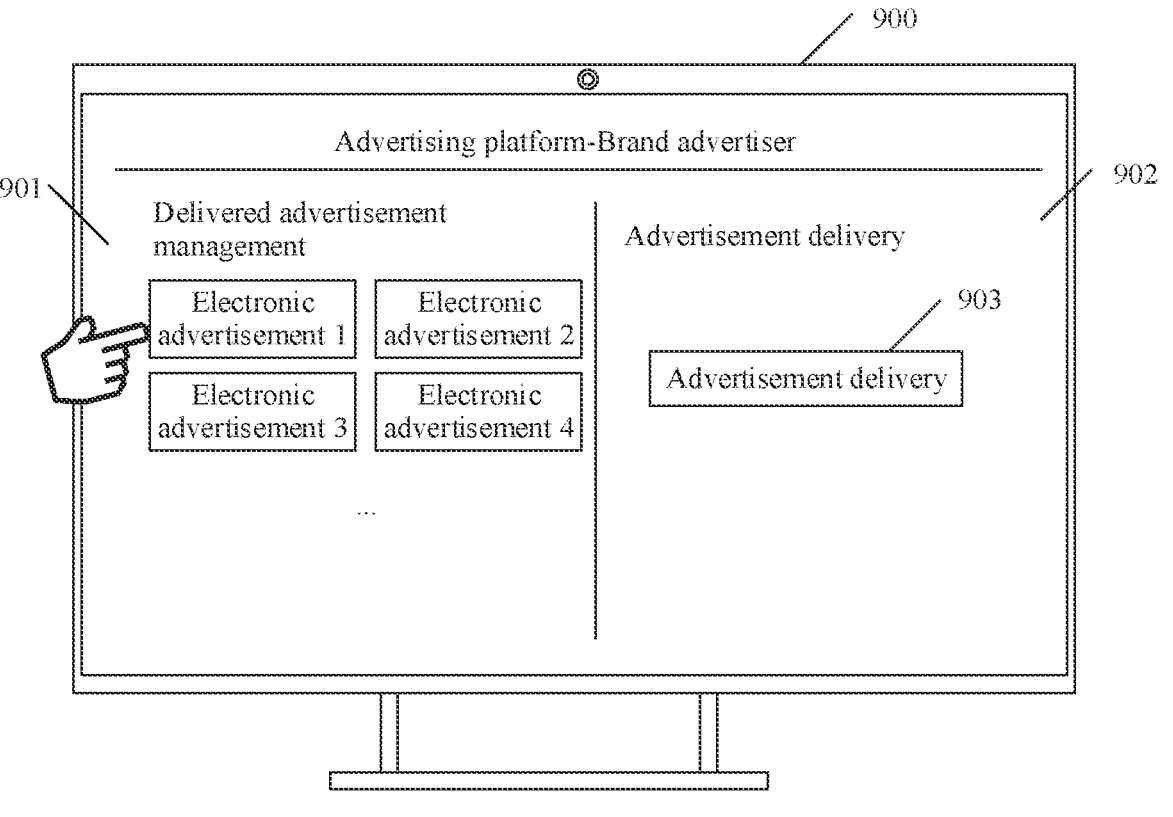
FIG. 9A is a schematic diagram of a terminal display interface of a brand advertiser according to an embodiment of this application.

For example, the second electronic device 150 is a PC 900 shown in FIG. 9A. As shown in FIG. 9A, the PC 900 may display a home page of an advertising platform. The home page of the advertising platform may include an advertisement delivery area 902 and a delivered advertisement management area 901, The advertisement delivery area 902 includes an "advertisement delivery" option 903.

The PC 900 may display an advertisement delivery interface in response to a click operation performed by a user on the "advertisement delivery" option 903. Through the advertisement delivery interface, the server 110 may provide the brand advertiser with services such as delivering an electronic advertisement, setting a delivery policy of the electronic advertisement (for example, playing the electronic advertisement of the brand advertiser on which advertising device according to which advertisement play policy), predicting exposure traffic of the electronic advertisement, and predicting an audience of the electronic advertisement. That is, the advertisement delivery service may further include services such as adding an advertisement resource of an electronic advertisement, setting a delivery policy of the electronic advertisement, predicting exposure traffic of the electronic advertisement, and predicting an audience of the electronic advertisement. The service of predicting exposure traffic and an audience of the electronic advertisement means that the server 110 may predict exposure traffic and an audience of the electronic advertisement that are generated when the electronic advertisement is delivered according to a delivery policy that is set by the brand advertiser. The server 110 may receive effective exposure events reported by a plurality of mobile terminals 130, and store exposure data of the effective exposure events. The exposure data stored in the server 110 may be referred to as historical exposure data. The server 110 may determine an advertisement type of the electronic advertisement based on the advertisement resource of the electronic advertisement, for example, an advertisement of an electronic product (for example, a mobile phone), an advertisement of a household appliance, an advertisement of clothing, shoes, and boots, an advertisement of home life, or an advertisement of beauty and makeup. The server 110 may determine, according to the delivery policy of the electronic advertisement, an advertisement slot for playing the electronic advertisement and a play time period of the electronic advertisement. Then, the server 110 may analyze the foregoing historical exposure data to predict exposure traffic and an audience of the electronic advertisement of the foregoing advertisement type that are generated when the electronic advertisement is played in the play time period on the advertisement slot indicated by the delivery policy.

It should be noted that, for detailed descriptions of the effective exposure event, refer to related descriptions in the following embodiment. Details are not described in this embodiment of this application.

The delivered advertisement management area 901 shown in FIG. 9A may include a plurality of electronic advertisement options, for example, an "electronic advertisement 1" option, an "electronic advertisement 2" option, an "electronic advertisement 3" option, and an "electronic advertisement 4" option. The electronic advertisement option is used to query an electronic advertisement delivery status.

Figure 9B:
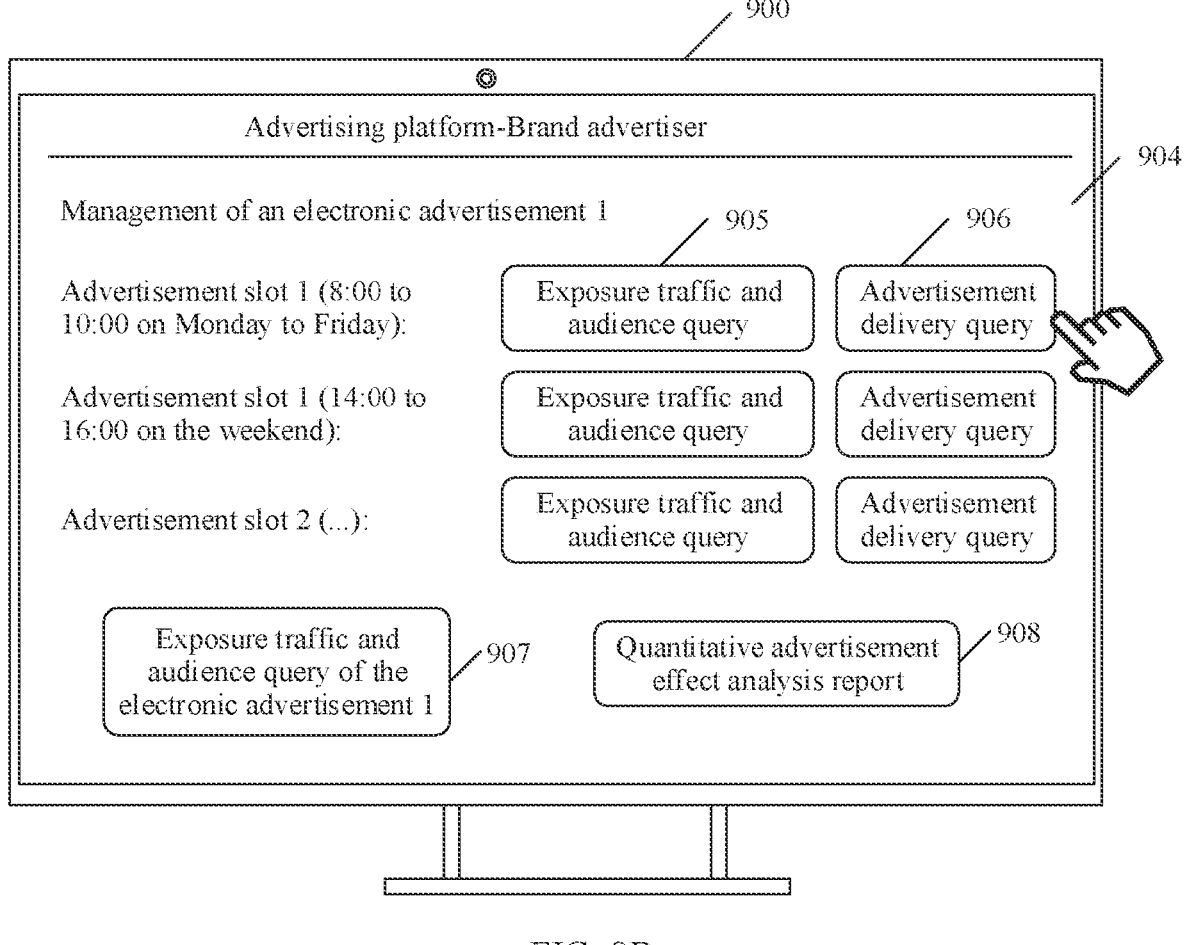
FIG. 9B is a schematic diagram of a terminal display interface of another brand advertiser according to an embodiment of this application.

For example, as shown in FIG. 9B, the PC 900 may display a management interface 904 of an electronic advertisement 1 in response to a click operation (for example, a single-click operation) performed by a brand advertiser on the "electronic advertisement 1" option. The management interface 904 includes an "advertisement delivery query" button 906 of an advertisement slot (for example, an advertising device) in which the electronic advertisement 1 is delivered.

In response to a click operation (for example, a single-click operation) performed by the brand advertiser on the "advertisement delivery query" button 906, the PC 900 may request the server 110 to query a delivery status of the electronic advertisement 1 played in the advertisement slot 1 from 8:00 to 10:00 on Monday to Friday. The PC 900 may receive a query result from the server 110, and display a query result interface 909 shown in FIG. 9C or a query result interface 912 shown in FIG. 9D.

Figure 9C:
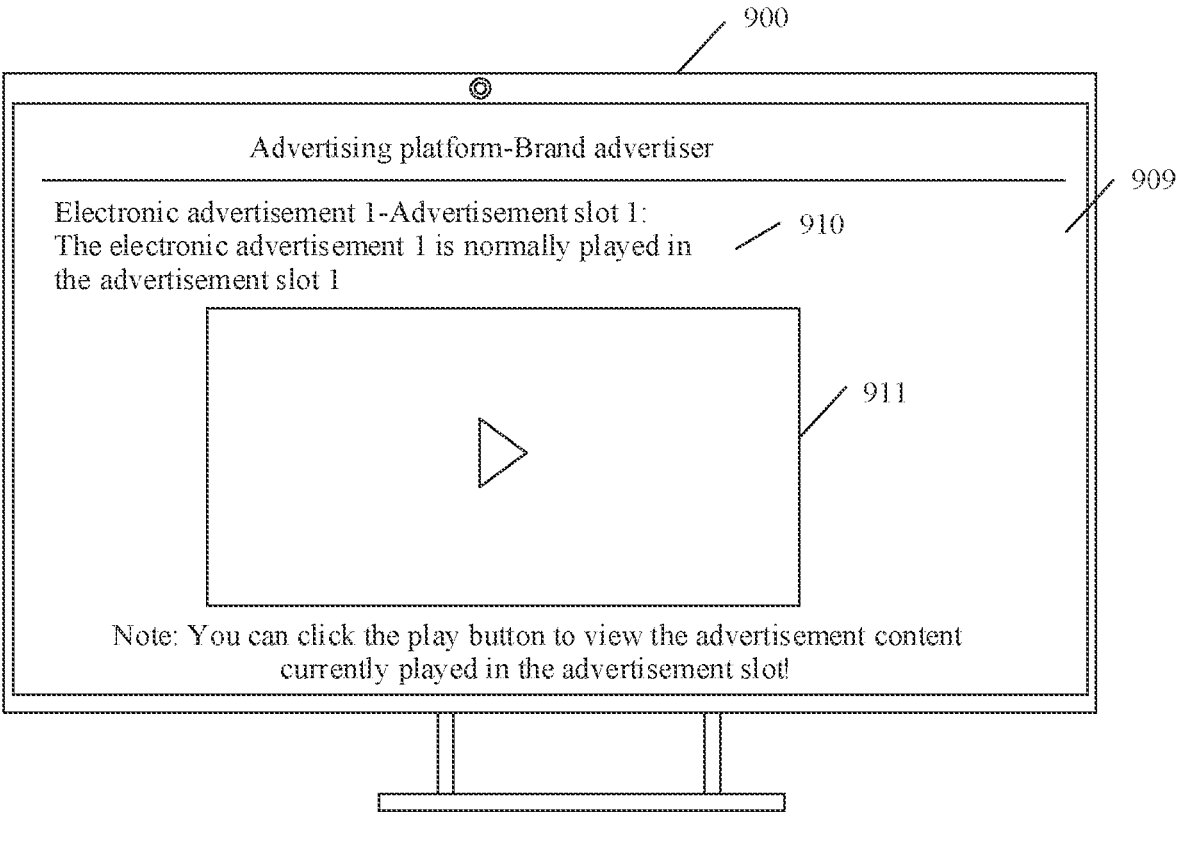
FIG. 9C is a schematic diagram of, terminal display interface of another brand advertiser according to an embodiment of this application.

For example, if the delivery status of the electronic advertisement 1 played in the advertisement slot 1 from 8:00 to 10:00 on Monday to Friday is normal, the PC 900 may display the query result interface 909 shown in FIG. 9C. The query result interface 909 may include indication information 910, for example, "the electronic advertisement 1 is normally played in the advertisement slot 1". That is, an advertising device corresponding to the advertisement slot 1 plays the electronic advertisement 1 from 8:00 to 10:00 on Monday to Friday.

Figure 9D:
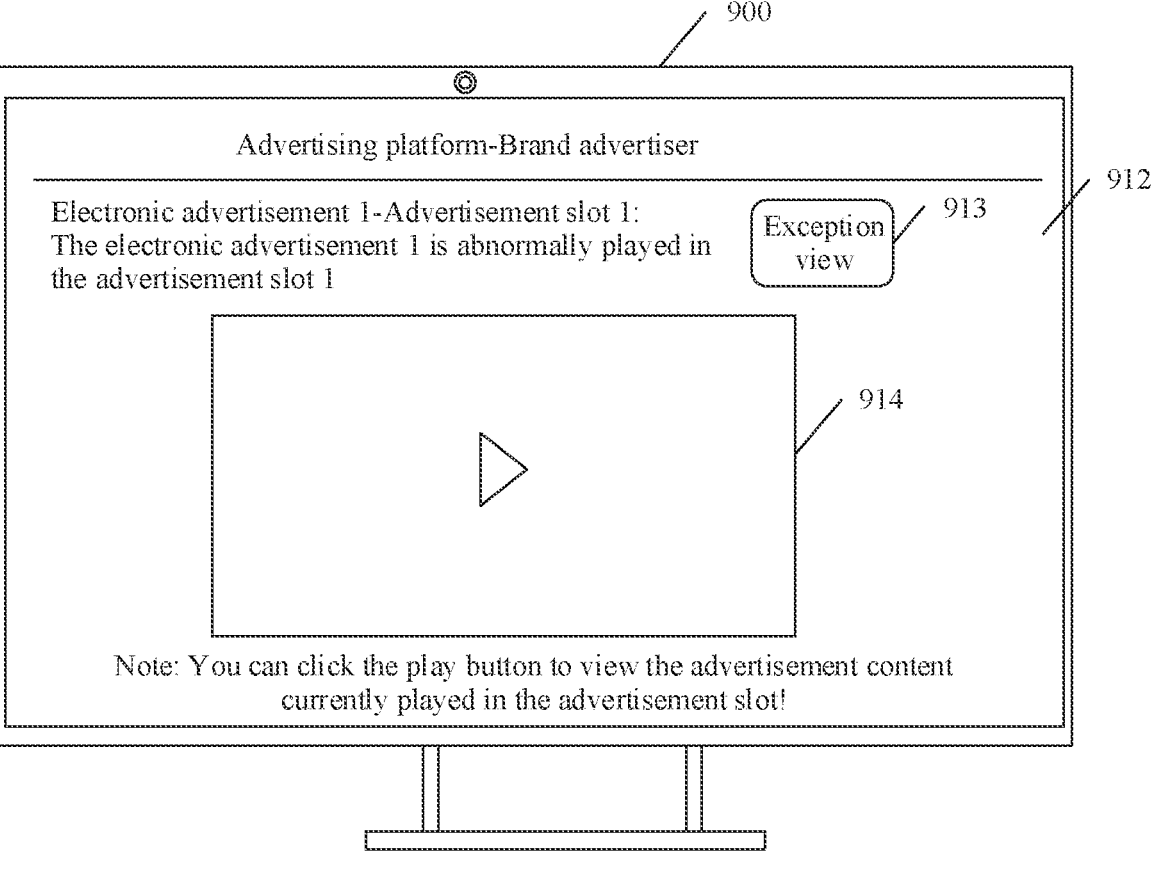
FIG. 9D is a schematic diagram of a terminal display interface of another brand advertiser according to an embodiment of this application.

If the delivery status of the electronic advertisement 1 played in the advertisement slot 1 from 8:00 to 10:00 on Monday to Friday is abnormal, the PC 900 may display the query result interface 912 shown in FIG. 9D. The query result interface 912 may include indication information, for example, "the electronic advertisement 1 is abnormally played in the advertisement slot 1". That is, the advertising device corresponding to the advertisement slot 1 does not normally play the electronic advertisement 1 from 8:00 to 10:00 on Monday to Friday. In response to a click operation performed by the brand advertiser on an "exception view" button 913 shown in FIG. 9D, the PC 900 may request the server 110 to query a specific status of a play exception. For example, the advertising device corresponding to the advertisement slot 1 plays the electronic advertisement 1 only from 8:00 to 9:00 on Monday to Friday, and does not play the electronic advertisement 1 from 9:00 to 10:00 on Monday to Friday. Alternatively, the advertising device corresponding to the advertisement slot 1 plays the electronic advertisement 1 only from 8:00 to 10:00 on Monday to Thursday, and does not play the electronic advertisement 1 from 8:00 to 10:00 on Friday.

Optionally, the option of the electronic advertisement that is shown in FIG. 9A may be further used to query exposure traffic and an audience of the electronic advertisement. For example, the management interface 904 of the electronic advertisement 1 that is shown in FIG. 9B may further include an "exposure traffic and audience query" button 905, an "exposure traffic and audience query" button 907 of the electronic advertisement 1, and a "quantitative advertisement effect analysis report" button 908.

In response to a click operation (for example, a click operation) performed by the brand advertiser on the "exposure traffic and audience query" button 905, the PC 900 may request the server 110 to query exposure traffic and an audience of the electronic advertisement 1 that are generated when the electronic advertisement 1 is played in the advertisement slot 1 from 8:00 to 10:00 on Monday to Friday. The server 110 may collect statistics about a quantity of effective exposure events of the electronic advertisement 1 that are generated when the electronic advertisement 1 is played in the advertisement slot 1 from 8:00 to 10:00 on Monday to Friday, and then use the counted quantity of effective exposure events as the exposure traffic of the electronic advertisement 1 that is generated when the electronic advertisement 1 is played, in the advertisement slot 1 from 8:00 to 10:00 on Monday to Friday. The server 110 may collect statistics about identifiers of mobile terminals in the effective exposure events. It may be understood that different mobile terminals correspond to different audiences. The server 110 may store a correspondence between the identifier of the mobile terminal and the user (that is, the audience). Therefore, the server 110 may determine, based on the identifier of the mobile terminal in the effective exposure event, the audience of the electronic advertisement 1 that is generated when the electronic advertisement 1 is played from 8:00 to 10:00 on Monday to Friday, that is, may determine users who watch the electronic advertisement 1. The server 110 may send a query result including the exposure traffic and the audience to the PC 900. The PC 900 may receive and display the query result (not shown in the accompanying drawing) from server 110.

In response to a click operation (for example, a single-click operation) performed by the brand advertiser on the "exposure traffic and audience query" button 907 of the electronic advertisement 1, the PC 900 may request the server 110 to query exposure traffic and an audience of the electronic advertisement 1 that are generated when the electronic advertisement 1 is played in an advertisement slot indicated by a delivery policy. The PC 900 may receive and display a query result (not shown in the accompanying drawing) from the server 110.

In response to a click operation (for example, a single-click operation) performed by the brand advertiser on the "quantitative advertisement effect analysis report" button 908, the PC 900 may request the server 110 to generate a quantitative advertisement effect analysis report. In response to the request of the PC 900, the server 110 may generate the quantitative advertisement effect analysis report. The quantitative advertisement effect analysis report may include exposure traffic and audience analysis data of the electronic advertisement 1 that is generated when the electronic advertisement 1 is played in an advertisement slot indicated by a delivery policy. The PC 900 may receive and display the quantitative advertisement effect analysis report from the server 110.

It should be noted that, in this embodiment of this application, the page or the interface of the advertising platform provided by the server 110 includes but is not limited to the page or the interface shown in FIG. 9A, FIG. 9B, FIG. 9C, or FIG. 9D. A specific form of the page or the interface of the advertising platform provided by the server 110 is not limited in this embodiment of this application.

In some embodiments, a camera may be further installed on the advertising device 120, and the camera is configured to monitor an electronic advertisement played by the advertising device 120. For example, a camera 411 is installed on the electronic billboard 410 shown in FIG. 4. For another example, a camera 511 is installed on the electronic billboard 510 shown in FIG. 5, and a camera 521 is installed on the electronic billboard 520 shown in FIG. 5.

For example, an orientation of a lens of the camera may be aligned with a display of the advertising device 120, to collect an image of the electronic advertisement played by the advertising device 120. For example, when a camera is installed on the advertising device 120, the camera may be adjusted to control a viewing range of the camera to be on the display of the advertising device 120.

It should be noted that, to avoid infringing user privacy because the camera installed on the advertising device 120 monitors and identifies a surrounding user, when the camera is installed on the advertising device 120, the lens of the camera needs to be prevented from aiming at a location around the advertising device 120 at which a user may pass.

Figure 9E:
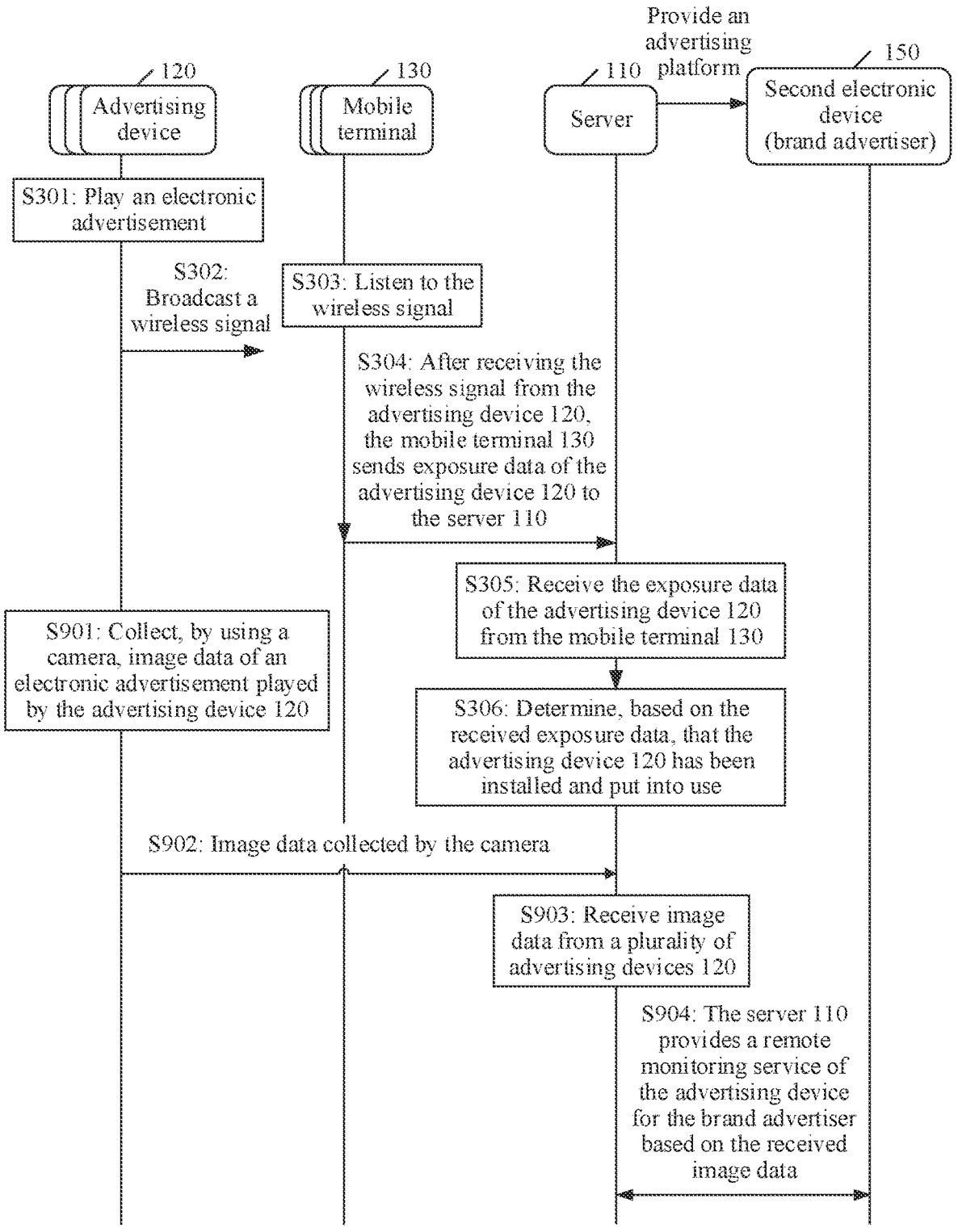
FIG. 9E is a flowchart of an advertising device monitoring method according to an embodiment of this application.

In this embodiment, the foregoing method may further include S901 to S903. For example, with reference to FIG. 3, as shown in FIG. 9E, the method in this embodiment of this application may further include S901 to S904.

S901: The advertising device 120 collects, by using the camera, image data of the electronic advertisement played by the advertising device 120.

S902: The advertising device 120 sends the image data collected by the camera to the server 110.

For example, the advertising device 120 may send the image data collected by the camera to the server 110 by using a wireless communications module or a mobile communications module. For detailed descriptions of the wireless communications module and the mobile communications module of the advertising device 121), refer to descriptions of the wireless communications module and the mobile communications module of the mobile terminal 130 shown. In FIG. 2A in the foregoing embodiment. Details are not described in this embodiment of this application.

S903: The server 110 receives image data from a plurality of advertising devices 120.

The advertising device 120 may send the image data collected by the camera to the server 110 in real time. Alternatively, the advertising device 120 may send the image data collected by the camera to the server 110 periodically.

S904: The server 110 provides a remote monitoring service of the advertising device for the brand advertiser based on the received image data.

After receiving the image data reported by the advertising device 120, the server 110 may provide the remote monitoring service of the advertising device for the brand advertiser. That is, the foregoing advertisement delivery service may further include the remote monitoring service. For example, the query result interface 909 shown in FIG. 9C includes a video play window 911. The query result interface 912 shown in FIG. 9D includes a video play window 914. In response to a click operation performed by the brand advertiser on a play button in the video play window 911 or the video play window 914, the PC 900 may obtain, from the server 110, video data collected by a camera of the advertisement slot 1, and play the video data.

In this embodiment of this application, the advertising platform provided by the server 110 may further provide the remote monitoring service of the advertising device for the brand advertiser, so that the brand advertiser can monitor the delivery status of the electronic advertisement.

It may be understood that, to implement the foregoing functions, the foregoing mobile terminal 130 includes corresponding hardware structures and; or software modules for performing the functions. A person skilled in the art should be easily aware that, in combination with the examples described in embodiments disclosed in this specification, units, algorithms, and steps may be implemented by hardware or a combination of hardware and computer software in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of this application.

In embodiments of this application, function modules in the mobile terminal 130 (for example, a mobile phone) may be defined based on the foregoing method examples. For example, each function module may be defined in a correspondence to each function, or two or more functions may be integrated into one processing module. The integrated module may be implemented in a form of hardware, or may be implemented in a form of a software function module. It should be noted that, in embodiments of this application, module division is an example, and is merely logical function division. In actual implementation, another division manner may be used.

Figure 10:
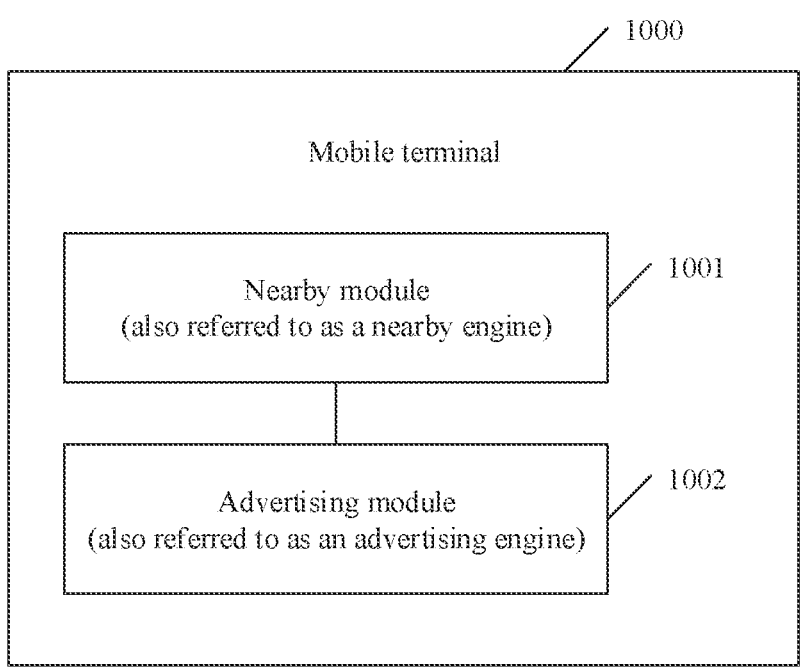
FIG. 10 is a schematic diagram of a structure of a mobile terminal according to an embodiment of this application.

FIG. 10 is a possible schematic diagram of a structure of a mobile terminal in the foregoing first application scenario. As shown in FIG. 10, the mobile terminal 1000 may include a nearby module 1001 and an advertising module 1002.

The nearby module 1001 is configured to support the mobile terminal 1000 in performing S303 in the foregoing embodiment, to perform repeated detection on the detected wireless signal, and/or is configured to perform another process of the technology described in this specification. The advertising module 1002 is configured to support the mobile terminal 1000 in performing S304, S603, S604, and S605 in the foregoing embodiments, and/or is configured to perform another process of the technology described in this specification.

Optionally, the mobile terminal 1000 may further include an awareness module. The awareness module is configured to: collect real-time location information of the mobile terminal 1000, and indicate the collected real-time location information to the advertising module 1002.

It should be noted that, as shown in FIG. 10, the nearby module 1001 may also be referred to as a nearby engine (that is, a nearby engine), and the advertising module 1002 may also be referred to as an advertising engine (or an ads advertising engine). The awareness module may also be referred to as an awareness engine (or an awareness engine).

It may be understood that the mobile terminal 1000 may implement functions of the nearby engine, the awareness engine, and the advertising engine by using a combination of software and hardware. For example, the mobile terminal 1000 may create a service process 1, and the service process 1 may invoke a wireless communications module (for example, a Bluetooth module or a Wi-Fi module) to implement the function of the nearby engine. For another example, the mobile terminal 1000 may create a service process 3, and the service process 3 may invoke a processor and a communications module (for example, a wireless communications module or a mobile communications module) to implement the function of the advertising engine. For another example, the mobile terminal 1000 may create a service process 2, and the service process 2 may invoke a positioning module (for example, a GPS positioning module) to implement the function of the awareness engine.

Figure 11:
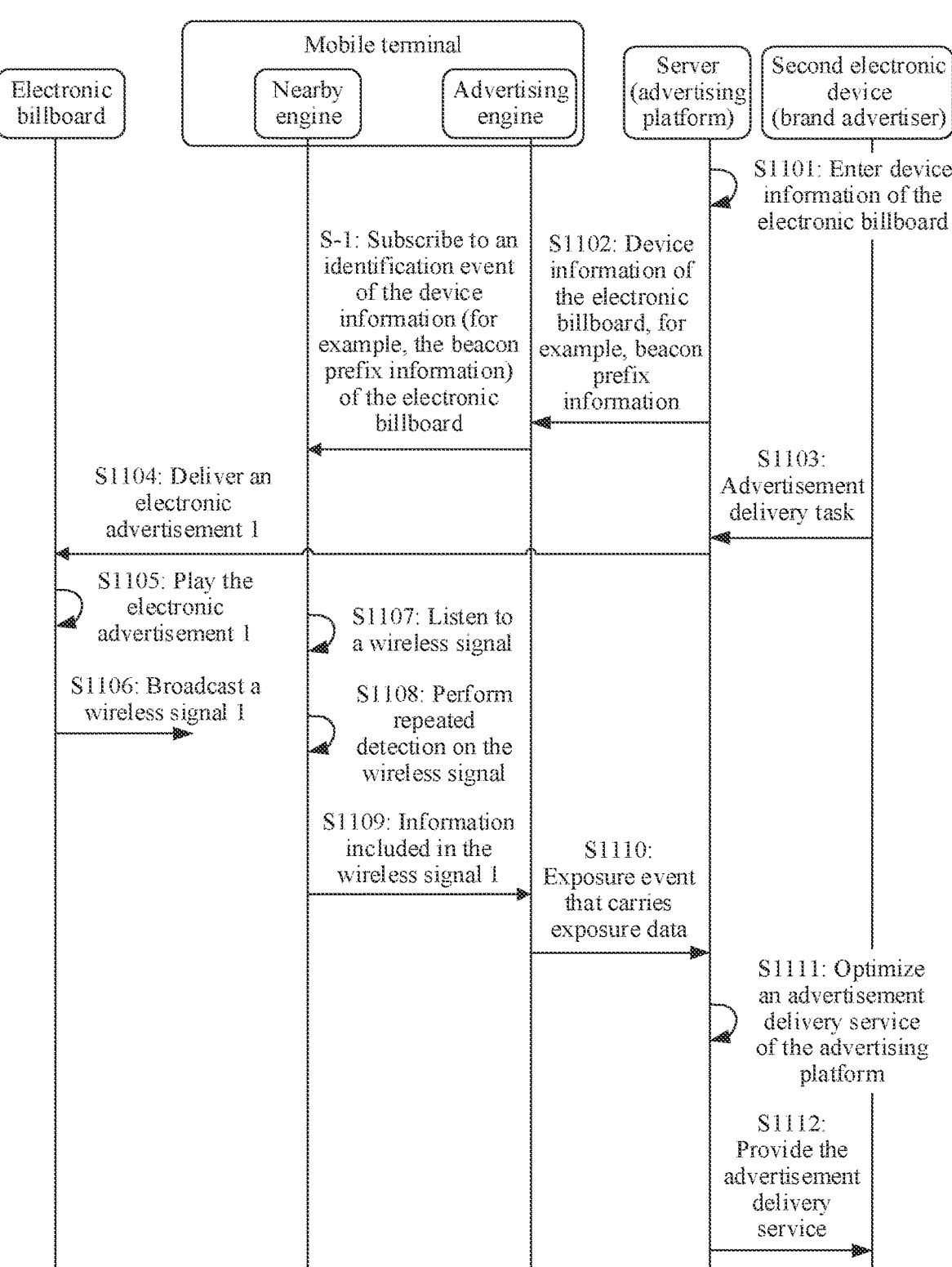
FIG. 11 is a flowchart of another advertising device monitoring method according to an embodiment of this application.

Refer to FIG. 11. A working principle of each function module of the mobile terminal 1000 shown in FIG. 11 is described based on interaction between the mobile terminal, the advertising device 120, and the server 110 in the foregoing embodiment by using an example in which the advertising device 120 is an electronic billboard.

As shown in FIG. 11, the server may perform S1101 of entering device information of the electronic billboard, and then perform S1102 of sending the device information (including beacon prefix information) of the electronic billboard to the mobile terminal. The server may periodically send the device information of the electronic billboard to the mobile terminal. The advertising engine of the mobile terminal may receive the device information of the electronic billboard from the server, and then perform S-1 of subscribing to an identification event of the device information of the electronic billboard from the nearby engine, to request the nearby engine to perform repeated detection on a detected wireless signal.

After S1101, the server may perform S1103 of receiving an advertisement delivery task from a second electronic device (that is, a brand advertiser), and perform S1104 of delivering an electronic advertisement 1 to the electronic billboard. The electronic billboard may perform S1105 of playing the electronic advertisement 1, and perform S1106 of broadcasting a wireless signal 1. The nearby engine of the mobile terminal may perform S1107 of listening to a wireless signal, for example, may detect the wireless signal 1 that is broadcast by the electronic billboard. In addition, in response to the subscription performed by the advertising engine in S-1, the nearby engine performs S1108 of performing repeated detection on the detected wireless signal. If the repeated detection succeeds (that is, the wireless signal 1 is detected for the first time within preset duration), the nearby engine performs S1109 of sending information (for example, a first identifier of the electronic billboard, bearing information of the electronic billboard, and an identifier of the electronic advertisement 1) included in the wireless signal 1 to the advertising engine.

The advertising engine may perform S1110 of reporting an exposure event to the server, where the exposure event carries exposure data (for example, the first identifier of the electronic billboard, first exposure duration, the identifier of the electronic advertisement 1, and an OAID of the mobile terminal). The server may perform S1111 of optimizing an advertisement delivery service of an advertising platform based on an effective exposure event reported by the mobile terminal, and perform S1112 of interacting with the second electronic device to provide the advertisement delivery service for the brand advertiser.

It should be noted that, for a specific implementation process of S1101 to S1112, refer to detailed descriptions in the foregoing embodiment. Details are not described again in this embodiment of this application.

Another embodiment of this application provides a mobile terminal (the mobile terminal 130 shown in FIG. 2A). The mobile terminal may include one or more processors, a memory, a wireless communications module, and a mobile communications module. The memory, the wireless communications module, and the mobile communications module are coupled to the processor. The memory is configured to store computer program code, where the computer program code includes computer instructions. When the processor executes the computer instructions, the mobile terminal may perform the functions or the steps performed by the mobile terminal 130 in the foregoing method embodiment. For a structure of the mobile terminal, refer to the structure of the mobile terminal 130 shown in FIG. 2A.

Another embodiment of this application provides an advertising device (the advertising device 120 shown in FIG. 2B). The advertising device may include one or more processors, a memory, a display, and a wireless communications module. The memory, the display, and the wireless communications module are coupled to the processor. The memory is configured to store computer program code, where the computer program code includes computer instructions. When the processor executes the computer instructions, the advertising device may perform the functions or the steps performed by the advertising device 120 in the foregoing method embodiment. For a structure of the advertising device, refer to the structure of the advertising device 120 shown in FIG. 2B.

Figure 12:
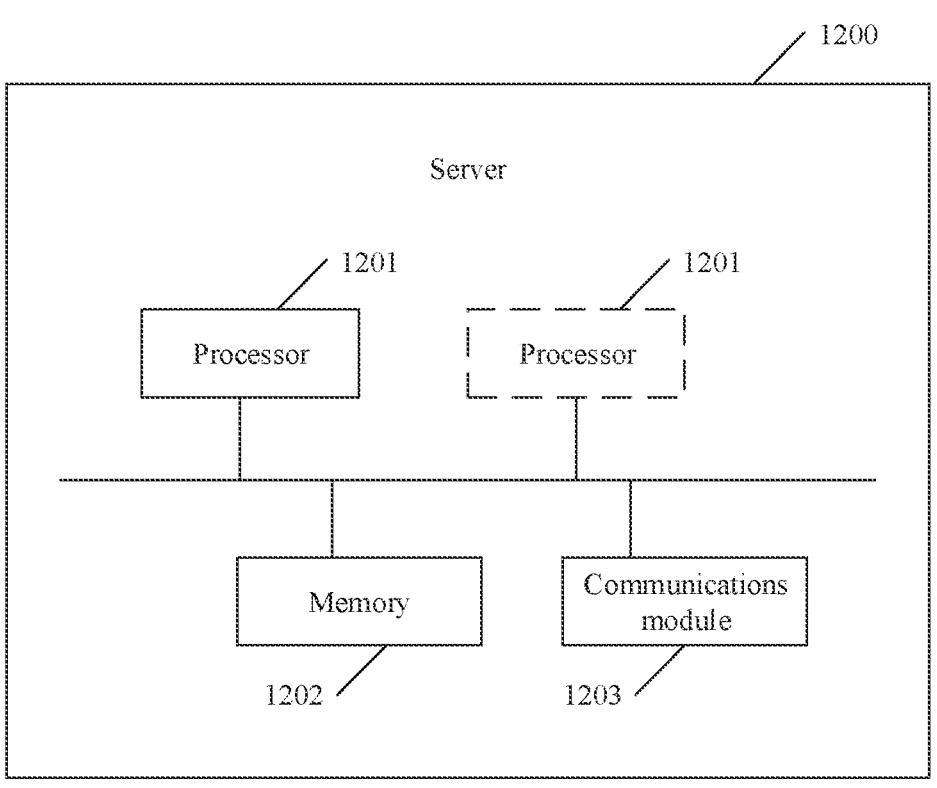
FIG. 12 is a schematic diagram of a structure of a server according to an embodiment of this application.

Another embodiment of this application provides a server. As shown in FIG. 12, the server 1200 may include one or more processors 1201, a memory 1202, and a communications module 1203. The memory 1202 and the communications module 1203 are coupled to the processor 1201. The memory 1202 is configured to store computer program code, where the computer program code includes computer instructions. The processor 1201 is configured to run the computer instructions, so that the server 1200 performs the functions or the steps performed by the server 110 in the foregoing method embodiment.

Figure 13:
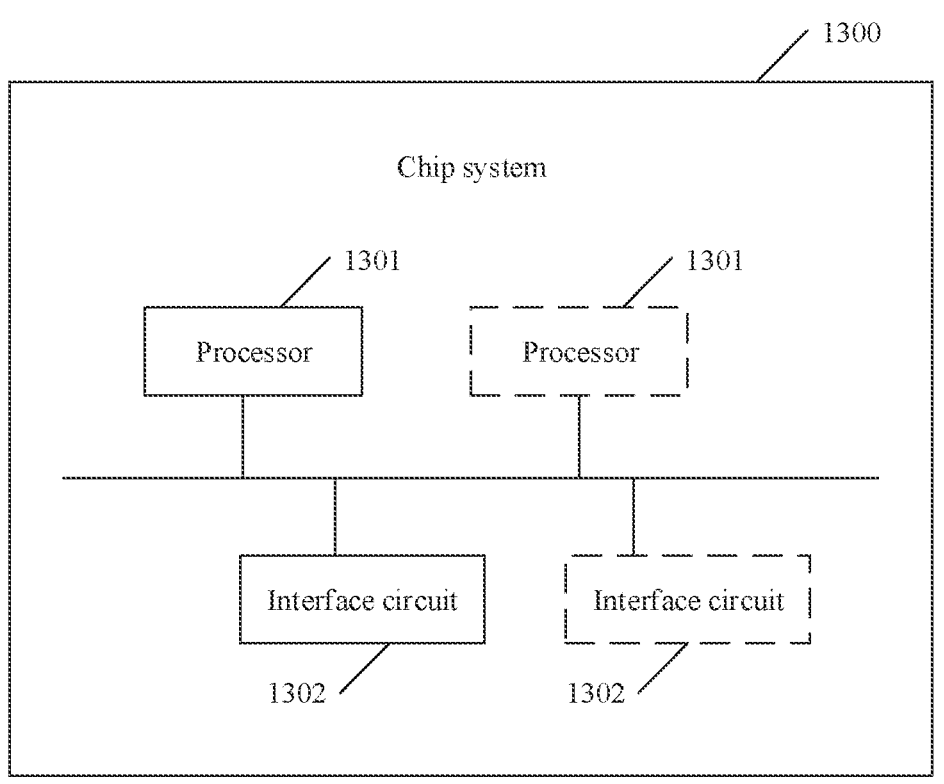
FIG. 13 is a schematic diagram of a structure of a chip system according to an embodiment of this application.

Another embodiment of this application provides a chip system. As shown in FIG. 13, the chip system 1300 includes at least one processor 1301 and at least one interface circuit 1302. The processor 1301 and the interface circuit 1302 may be interconnected through a line. For example, the interface circuit 1302 may be configured to receive a signal from another apparatus (for example, a memory in a mobile terminal, a memory in an advertising device, or a memory in a server). For another example, the interface circuit 1302 may be configured to send a signal to another apparatus (for example, the processor 1301).

For example, the chip system may be applied to the foregoing mobile terminal. The interface circuit 1302 may read instructions stored in the memory in the mobile terminal, and send the instructions to the processor 1301. When the instructions are executed by the processor 1301, the mobile terminal 130 (shown in FIG. 2A) is enabled to perform the steps in the foregoing embodiment.

For another example, the chip system may be applied to the foregoing advertising device. The interface circuit 1302 may read instructions stored in the memory in the advertising device, and send the instructions to the processor 1301. When the instructions are executed by the processor 1301, the advertising device 120 (shown in FIG. 2B) is enabled to perform the steps in the foregoing embodiment.

For another example, the chip system may be applied to the foregoing server. The interface circuit 1302 may read instructions stored in the memory in the server, and send the instructions to the processor 1301. When the instructions are executed by the processor 1301, the server (for example, the server 110) is enabled to perform the steps in the foregoing embodiment.

Certainly, the chip system may further include another discrete component. This is not specifically limited in this embodiment of this application.

An embodiment of this application further provides a computer-readable storage medium. The computer-readable storage medium includes computer instructions. When the computer instructions are run on a mobile terminal (for example, the mobile terminal 130), the mobile terminal is enabled to perform the functions or the steps performed by the mobile terminal 130 in the foregoing method embodiment.

An embodiment of this application further provides a computer program product. When the computer program product is run on a computer, the computer is enabled to perform the functions or the steps performed by the mobile terminal 130 in the foregoing method embodiment.

An embodiment of this application further provides a computer-readable storage medium. The computer-readable storage medium includes computer instructions. When the computer instructions are run on an advertising device (for example, the advertising device 120), the advertising device is enabled to perform the functions or the steps performed by the advertising device 120 in the foregoing method embodiment.

An embodiment of this application further provides a computer program product. When the computer program product is run on a computer, the computer is enabled to perform the functions or the steps performed by the advertising device 120 in the foregoing method embodiment.

An embodiment of this application further provides a computer-readable storage medium. The computer-readable storage medium includes computer instructions. When the computer instructions are run on a server (for example, the server 110), the server is enabled to perform the functions or the steps performed by the server 110 in the foregoing method embodiment.

An embodiment of this application further provides a computer program product. When the computer program product is run on a computer, the computer is enabled to perform the functions or the steps performed by the server 110 in the foregoing method embodiment.

The foregoing descriptions about implementations allow a person skilled in the art to clearly understand that, for the purpose of convenient and brief description, division of the foregoing functional modules is used as an example for illustration. In actual application, the foregoing functions can be allocated to different modules and implemented based on a requirement, that is, an internal structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, the division into modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, in other words, may be located in one place, or may be distributed on different places. Some or all of the units may be selected based on actual requirements to achieve the objectives of the solutions of embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software functional unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for monitoring an advertising device, wherein the method comprises:

broadcasting, by the advertising device, a wireless signal, wherein the wireless signal comprises a first identifier of the advertising device and bearing information of the advertising device, and wherein the bearing information is used to indicate a location and an orientation of the advertising device;

detecting, by a mobile terminal, the wireless signal;

in response to detecting the wireless signal, determining, by the mobile terminal based on device information of a plurality of advertising devices that is stored in the mobile terminal, that the wireless signal is broadcast by the advertising device, wherein the advertising device is one of the plurality of advertising devices;

after determining that the wireless signal is broadcast by the advertising device, collecting, by the mobile terminal, statistics about a first exposure duration of the advertising device for the mobile terminal, wherein the first exposure duration is a duration in which a bearing of the mobile terminal relative to the advertising device meets a preset condition, and wherein the preset condition is met when a distance between the mobile terminal and the advertising device is within a preset distance range, the mobile terminal is located on one side of the orientation of the advertising device, and an included angle between a movement direction of the mobile terminal and the orientation of the advertising device is within a preset included angle range;

determining, by the mobile terminal, that the first exposure duration is greater than a preset exposure duration;

after determining that the first exposure duration is greater than the preset exposure duration, sending, by the mobile terminal, exposure data of the advertising device to a server, wherein the exposure data comprises the first identifier of the advertising device;

receiving, by the server, the exposure data from the mobile terminal; and determining, by the server and based on the exposure data, whether the advertising device is installed and put into use.

2. The method according to claim 1, wherein the wireless signal further comprises an identifier of an electronic advertisement being played by the advertising device, and the exposure data further comprises the identifier of the electronic advertisement; and the method further comprises:

monitoring, by the server based on the identifier of the electronic advertisement, whether the electronic advertisement being played by the advertising device is delivered by the server.

3. The method according to claim 2, wherein the exposure data further comprises time information, and the time information is used to indicate a time at which the mobile terminal detects the wireless signal, and the method further comprises:

monitoring, by the server based on the time information, whether the advertising device plays the electronic advertisement in a time period specified by the server.

4. The method according to claim 1, wherein the exposure data further comprises the bearing information; and the method further comprises:

monitoring, by the server based on the bearing information, whether the location and the orientation of the advertising device meet requirements.

5. The method according to claim 1, wherein the method further comprises:

sending, by the server, the device information of the plurality of advertising devices to the mobile terminal, wherein the device information of the plurality of advertising devices comprises first identifiers of the plurality of advertising devices; and receiving and storing, by the mobile terminal, the device information of the plurality of advertising devices; and determining, by the mobile terminal based on the device information of the plurality of advertising devices that is stored in the mobile terminal, that the wireless signal is broadcast by the advertising device comprises:

determining, by the mobile terminal based on the first identifier in the wireless signal and the first identifiers of the plurality of advertising devices, that the wireless signal is a wireless signal that is broadcast by one of the plurality of advertising devices.

6. The method according to claim 1, wherein the wireless signal further comprises a second identifier of the advertising device; and the method further comprises:

sending, by the server, the device information of a plurality of advertising devices to the mobile terminal, wherein the device information of the plurality of advertising devices comprises second identifiers of the plurality of advertising devices, the second identifier is a wireless network identifier or prefix information of the wireless network identifier, and the prefix information is the first N characters of the wireless network identifier, wherein N≥2, and N is a positive integer; and receiving and storing, by the mobile terminal, the device information of the plurality of advertising devices; and determining, by the mobile terminal based on the device information of the plurality of advertising devices that is stored in the mobile terminal, that the wireless signal is broadcast by the advertising device comprises:

determining, by the mobile terminal based on the second identifier in the wireless signal and the second identifiers of the plurality of advertising devices, that the wireless signal is a wireless signal that is broadcast by one of the plurality of advertising devices.

7. An advertising system, wherein the system comprises an advertising device, a mobile terminal, and a server;

the advertising device is configured to broadcast a wireless signal, wherein the wireless signal comprises a first identifier of the advertising device and bearing information of the advertising device, and the bearing information is used to indicate a location and an orientation of the advertising device;

the mobile terminal is configured to:

detect the wireless signal;

in response to detecting the wireless signal, determining, by the mobile terminal based on device information of a plurality of advertising devices that is stored in the mobile terminal, that the wireless signal is broadcast by the advertising device, wherein the advertising device is one of the plurality of advertising devices;

after determining that the wireless signal is broadcast by the advertising device, collect, by the mobile terminal, statistics about a first exposure duration of the advertising device for the mobile terminal, wherein the first exposure duration is a duration in which a bearing of the mobile terminal relative to the advertising device meets a preset condition, and wherein the preset condition is met when a distance between the mobile terminal and the advertising device is within a preset distance range, the mobile terminal is located on one side of the orientation of the advertising device, and an included angle between a movement direction of the mobile terminal and the orientation of the advertising device is within a preset included angle range;

determine, by the mobile terminal, that the first exposure duration is greater than a preset exposure duration; and after determining that the first exposure duration is greater than the preset exposure duration, send exposure data of the advertising device to the server, wherein the exposure data comprises the first identifier of the advertising device; and the server is configured to:

receive the exposure data from the mobile terminal; and determine, based on the exposure data, whether the advertising device is installed and put into use.

8. The system according to claim 7, wherein the wireless signal further comprises an identifier of an electronic advertisement being played by the advertising device, and the exposure data further comprises the identifier of the electronic advertisement; and the server is further configured to monitor, based on the identifier of the electronic advertisement, whether the electronic advertisement being played by the advertising device is delivered by the server.

9. The system according to claim 8, wherein the exposure data further comprises time information, and the time information is used to indicate a time at which the mobile terminal detects the wireless signal; and the server is further configured to monitor, based on the time information, whether the advertising device plays the electronic advertisement in a time period specified by the server.

10. The system according to claim 7, wherein the exposure data further comprises the bearing information; and the server is further configured to monitor, based on the bearing information, whether the location and the orientation of the advertising device meet requirements.

\* \* \* \* \*